US009122399B2

(12) United States Patent
Nishina et al.

(10) Patent No.: US 9,122,399 B2
(45) Date of Patent: Sep. 1, 2015

(54) STORAGE SYSTEM AND STORAGE CONTROL METHOD

(71) Applicant: HITACHI, LTD., Tokyo (JP)

(72) Inventors: Tadato Nishina, Tokyo (JP); Hiroaki Akutsu, Tokyo (JP); Kohei Tatara, Tokyo (JP); Norio Shimozono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/241,784

(22) PCT Filed: Apr. 18, 2013

(86) PCT No.: PCT/JP2013/061485
§ 371 (c)(1),
(2) Date: Feb. 27, 2014

(87) PCT Pub. No.: WO2014/170984
PCT Pub. Date: Oct. 23, 2014

(65) Prior Publication Data
US 2014/0317340 A1    Oct. 23, 2014

(51) Int. Cl.
*G06F 12/00* (2006.01)
*G06F 3/06* (2006.01)
(52) U.S. Cl.
CPC ............ *G06F 3/0608* (2013.01); *G06F 3/0658* (2013.01); *G06F 3/0689* (2013.01); *G06F 2003/0695* (2013.01)

(58) Field of Classification Search
CPC ... G06F 3/0608; G06F 11/1012; G06F 11/08; G06F 11/1076; G06F 17/30153
See application file for complete search history.

(56) References Cited

U.S. PATENT DOCUMENTS

| | | | |
|---|---|---|---|
| 7,437,658 B2 * | 10/2008 | Kobayashi | 714/801 |
| 2005/0078399 A1 * | 4/2005 | Fung et al. | 360/69 |
| 2008/0101605 A1 | 5/2008 | Kitamura et al. | |
| 2009/0055688 A1 * | 2/2009 | Hafner et al. | 714/42 |
| 2009/0070356 A1 * | 3/2009 | Mimatsu | 707/101 |
| 2011/0320915 A1 | 12/2011 | Khan | |

FOREIGN PATENT DOCUMENTS

| | | |
|---|---|---|
| JP | 2008-108039 A | 5/2008 |
| JP | 2009-070361 A | 4/2009 |
| WO | 2010/137178 A1 | 12/2010 |

* cited by examiner

Primary Examiner — Cheng-Yuan Tseng
Assistant Examiner — Alan Otto
(74) Attorney, Agent, or Firm — Mattingly & Malur, PC

(57) ABSTRACT

A storage system includes: a storage device including a recording medium that stores data and a device controller that executes addition processing involving a change of state of the data with respect to the data; and a storage controller that controls input and output of data for the storage device. The storage controller transmits, to the storage device, determination information that can be utilized by the device controller for determining whether or not to execute the addition processing along with input-output processing relating to input-output target data. The device controller controls execution of the addition processing with respect to the input-output target data based on the determination information transmitted from the storage controller.

8 Claims, 34 Drawing Sheets

STORAGE SYSTEM AND STORAGE CONTROL METHOD

TECHNICAL FIELD

The present invention relates to storage control of a storage system having a storage device capable of executing predetermined processing with respect to storage target data.

BACKGROUND ART

In a storage system, a storage controller performs control of IO with respect to a storage device that is a final storage apparatus for data. Along with an increase in the amount of data handled in companies in recent years, costs for data storage is also increasing due to an increase in storage devices necessary for storing data. Therefore, a reduction in cost for holding data in a storage system is desired. As one technique that addresses this need, there is a technique of reducing the data storage amount by compressing data stored in a storage device (e.g., hard disk drive (HDD) or solid state drive (SSD)). Due to the increase in data amounts, it is desired that data compression techniques be applied not only to a volume for backup application but also to a volume (primary volume) used in normal operations.

Regarding the compression technique, PTL 1 discloses a technique in which a flash device implements data compression processing in order to reduce the data volume stored in the flash device such as an SSD in which a recording medium is a flash memory with high bit cost.

CITATION LIST

Patent Literature

[PTL 1] US Patent Application Publication No. 2011/320915
[PTL 2] WO 2010/137178

SUMMARY OF INVENTION

Technical Problem

With the technique of PTL 1, the load on a storage controller is reduced compared to a case where a storage controller implements compression processing, since the flash device implements the compression processing. However, since the flash device implements the compression processing in addition to IO processing, the performance of the flash device decreases compared to when the compression processing is not implemented. Since the IO processing of the flash device is higher in speed compared to an HDD, the influence of compression/decompression processing on the performance increases. That is, in the case where the compression processing is implemented with the flash device, the performance degradation rate increases compared to a case where the compression processing is implemented with an HDD.

In a storage system, there are cases where a redundant array of independent disks (RAID) group is formed to create a parity (redundant code) for the purpose of increasing the speed of IO processing or improving fault tolerance. As parity creation methods for a RAID group, there is a conventionally-known method in which a controller of a storage system creates a parity and a method disclosed in PTL 2 in which a storage device creates a parity. When a compression technique is applied to such a system, decompression of old data and old parity and compression of new data and new parity are necessary with respect to one host write at the time of a random write. That is, the compression/decompression processing is performed two times each, thus further increasing the performance degradation rate.

In the case where a compression technique is applied to a primary volume, the influence of performance degradation due to data compression on operations is large, and it is a task to prevent performance degradation while reducing the data storage amount with compression. For example, in on-line transaction processing (OLTP) that frequently involves access to a database, a random write is relatively frequent, and the performance degradation in the case of data compression also increases.

Solution to Problem

A storage system includes a storage device including a recording medium that stores data and a device controller that executes addition processing involving a change of state of data with respect to data and a storage controller that controls input and output of data for the storage device. The storage controller transmits, to the storage device, determination information that can be utilized by the device controller for determining whether or not to execute the addition processing along with input-output processing relating to input-output target data. The device controller controls execution of the addition processing with respect to the input-output target data based on the determination information transmitted from the storage controller.

Advantageous Effects of Invention

A flash device determines the necessity of compression processing based on the information transmitted from the storage controller. Accordingly, the storage amount of data is reduced to enable a reduction in cost, and the write performance can be improved from the case where entire data is compressed.

BRIEF DESCRIPTION OF DRAWINGS

FIG. 1 is a hardware configuration diagram of a computer system according to Example 1.
FIG. 2 is a hardware configuration diagram of an FMPK according to Example 1.
FIG. 3 is a diagram showing an overview of parity creation processing at the time of a random write according to Example 1.
FIG. 4 is a flowchart of the parity creation processing at the time of a random write according to Example 1.
FIG. 5 is a flowchart of XDWRITE processing according to Example 1.
FIG. 6 is a flowchart of XDREAD processing according to Example 1.
FIG. 7 is a flowchart of XPWRITE processing according to Example 1.
FIG. 8 is a diagram showing an overview of parity determination information registration processing according to Example 2.

FIG. 9 is a configuration diagram of one example of parity determination information according to Example 2.
FIG. 10 is a diagram showing an overview of RMW parity creation processing according to Example 2.
FIG. 11 is a diagram showing an overview of all-stripe parity creation processing according to Example 2.
FIG. 12 is a flowchart of parity creation processing according to Example 2.
FIG. 13 is a flowchart of READ processing according to Example 2.
FIG. 14 is a flowchart of WRITE processing according to Example 2.
FIG. 15 is a diagram showing an overview of collection copy processing according to Example 2.
FIG. 16 is a flowchart of the collection copy processing according to Example 2.
FIG. 17 is a diagram showing an overview of RMW parity creation processing in the case of creating a parity using data after compression according to Example 3.
FIG. 18 is a diagram showing an overview of the RMW parity creation processing in the case of creating a parity using data before compression according to Example 3.
FIG. 19 is a diagram showing an overview of all-stripe parity creation processing according to Example 3.
FIG. 20 is a configuration diagram of one example of an XDREAD/XDWRITE/XPWRITE command according to Example 3.
FIG. 21 is a flowchart of parity creation processing according to Example 3.
FIG. 22 is a flowchart of the RMW parity creation processing according to Example 3.
FIG. 23 is a flowchart of XDWRITE processing according to Example 3.
FIG. 24 is a flowchart of XDREAD processing according to Example 3.
FIG. 25 is a flowchart of XPWRITE processing according to Example 3.
FIG. 26 is a diagram showing an overview of collection copy processing for a stripe column having a parity that is created using data before compression according to Example 3.
FIG. 27 is a diagram showing an overview of the collection copy processing for a stripe column having a parity that is created using data after compression according to Example 3.
FIG. 28 is a flowchart of the collection copy processing according to Example 3.

FIG. 29 is a configuration diagram of one example of a READ/WRITE command according to Example 3.
FIG. 30 is a flowchart of READ processing according to Example 3.
FIG. 31 is a flowchart of WRITE processing according to Example 3.
FIG. 32 is a diagram showing an overview of function implementation determination information registration processing according to Example 4.
FIG. 33 is a diagram showing an overview of command processing according to Example 4.
FIG. 34 is a flowchart of the command processing according to Example 4.

DESCRIPTION OF EMBODIMENTS

Several examples will be described with reference to the drawings. The examples described below do not limit the invention set forth in the claims, and not all of various components and combinations thereof described in the examples is necessarily mandatory in the solution of the invention.

Although there are cases where processing is described with a "program" as the subject in the description below, the subject of processing may be a program since a program is executed by a processor (e.g., central processing unit (CPU)) to perform certain processing while appropriately using a storage resource (e.g., memory) and/or a communication interface device (e.g., port). Processing described with a program as the subject may be processing performed by a processor or a computer (e.g., management computer, host computer, or storage system) having the processor. A processor may include a hardware circuit that performs a part or all of processing performed by the processor. A program may be installed in each controller from a program source. A program source may be, for example, a program distribution server or recording medium.

EXAMPLE 1

An overview of a computer system including a storage system according to Example 1 will be described.

Figure 1:
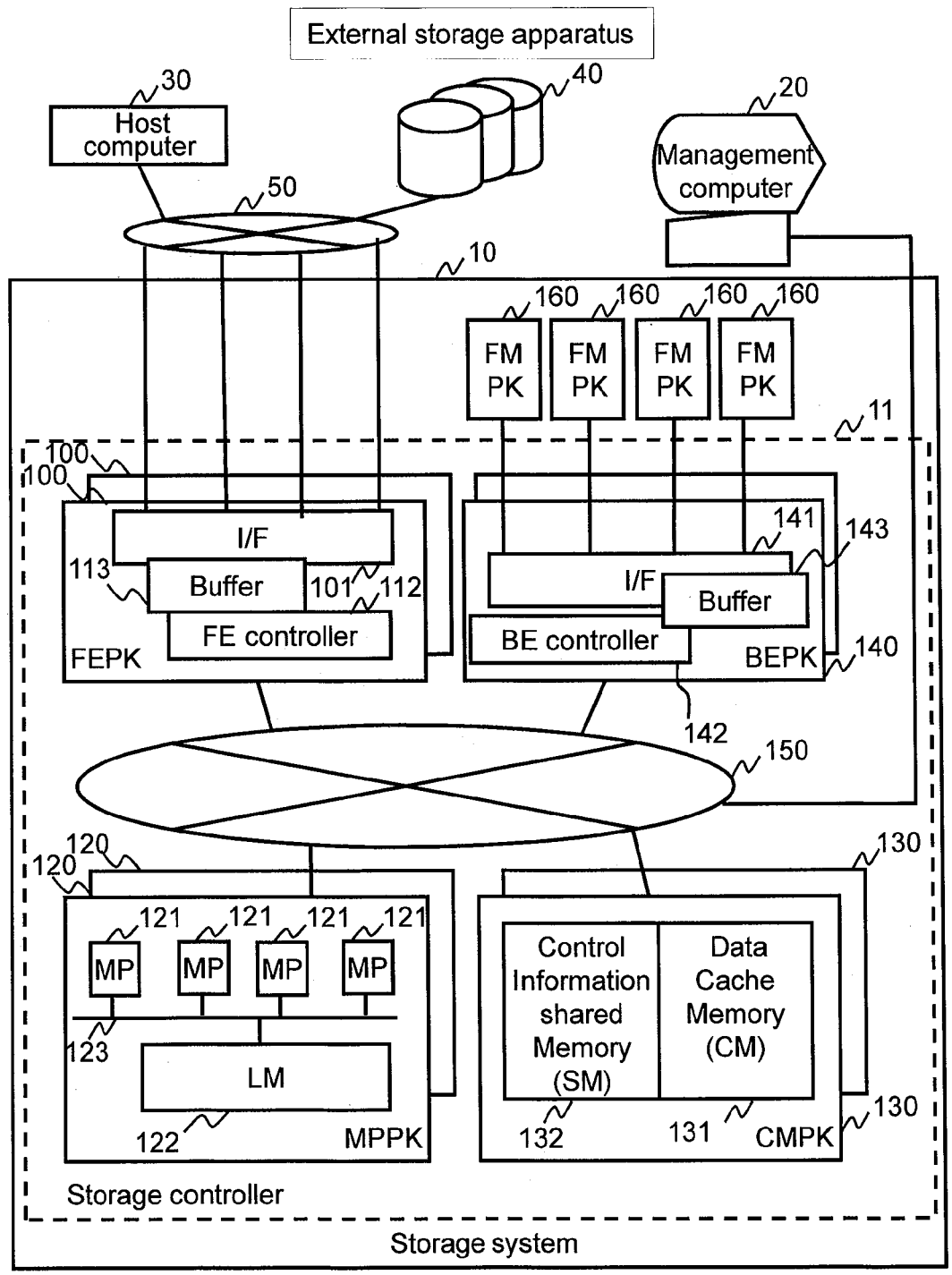
[FIG. 1]

As shown in FIG. 1, a storage system 10 may be an apparatus formed of one enclosure or may be formed in combination with an external storage apparatus 40, for example. The storage system 10 includes a plurality of storage devices such as, for example, a flash memory package (FMPK) 160. In the storage system 10, a redundant array of independent disks (RAID) group is formed using the plurality of storage devices.

The storage area of each storage device is divided into and managed in sub-storage areas called a stripe. That is, each storage device includes a plurality of stripes. The storage area of the RAID group is formed of a plurality of stripe columns. Each stripe column includes one each of the stripes included in the respective storage devices. That is, the stripe column spans the plurality of storage devices forming the RAID group.

There are several levels (hereinafter referred to as RAID levels) to RAID.

In RAID 5, for example, write target data that is designated from a host computer 30 is divided into a plurality of data elements, and the plurality of data elements are written in a plurality of stripes of the same stripe column. In RAID 5, redundant information (hereinafter referred to as "redundant code") called "parity" is created from the plurality of data elements included in the stripe column in order to recover a data element that has become unreadable from a storage device due to occurrence of a fault in the storage device. The redundant code is also written in the stripe of the same stripe column. For example, in the case where the number of storage devices forming a RAID group is four, three data elements forming a stripe column is written in three stripes corresponding to three of the storage devices, and the redundant code is written in a stripe corresponding to the remaining one storage device. In this case, the stripe column includes three data elements and a parity created from the three data elements. In the case where one of the data elements included in the stripe column including the parity is updated, the parity is also updated. The parity is created by, for example, an XOR operation of the plurality of data elements included in the same stripe column. Hereinafter, in the case where the data element and the redundant code are not distinguished, the two may each be referred to as a stripe data element.

In RAID 6, two types of redundant codes (called P parity and Q parity) are created with respect to each data unit and each redundant code is written in a stripe of the same stripe column, so that the two data elements can be recovered in the case where two data elements out of a plurality of data elements forming a data unit cannot be read due to a reason such as a fault that has occurred in two storage devices out of the plurality of storage devices forming a RAID group.

RAID levels (e.g., RAIDs 1 to 4) other than those described above also exist. As a redundancy technique for data, there are also triplication, triple parity technique using three types of parities, and the like. Also regarding creation techniques for a redundant code, various techniques exist such as Reed-Solomon code using Galois arithmetic, Even-Odd, and the like. In this example, an example in which the RAID level is RAID 5 will be mainly described. However, this does not limit the present invention. Other RAID levels are acceptable, and application may be with respect to a RAID using other techniques described above.

When a data element of a stripe column is updated, a redundant code for the stripe column is calculated and updated. As a calculation method for a redundant code, there are several methods depending on data used for calculating the redundant code. A first method is a method (hereinafter referred to as "all-stripe parity creation") in which all data elements of a stripe column are used for calculation. In the case where the access pattern is a sequential write, the first method is used in the case of updating all data elements included in a stripe column, for example. A second method is a method (hereinafter referred to as "read modify write (RMW) parity creation") in which data after update (new data) and data before update (old data, i.e., data updated by new data) for a part of data elements and a parity before update (old parity) are used for calculation. In the case where the access pattern is a random write, the second method is used in the case where a part of data elements included in a stripe column is updated, for example. The all-stripe parity creation and the RMW parity creation may be used separately in consideration of the load on the storage system.

The RMW parity creation will be described below with reference to FIG. 1. In the RMW parity creation, there are a method (hereinafter, conventional RMW) in which necessary data is read from the FMPK 160 into a CM 131 and a BE controller 142 or an MP 121 creates a redundant code and a method (hereinafter, offload RMW) in which a storage device such as the FMPK 160 creates a redundant code.

In the offload RMW in which the FMPK 160 creates a redundant code, a storage controller 11 utilizes commands described below in addition to a conventional READ/WITE command. One is an XDWRITE command used for transferring, to the FMPK 160, data (hereinafter, new data) that the host computer 30 has transmitted and indicating parity creation to the FMPK. The FMPK 160 that has received the XDWRITE command creates intermediate data using the transmitted new data and data (old data) stored in a storage area of the FMPK 160 of which the address is the same as the new data. Another one is an XDREAD command used for reading the intermediate data that the FMPK 160 has created. The FMPK 160 that has received the XDREAD command transfers the intermediate data created based on the XDWRITE command to a Buffer 143 of a BEPK 140. A further one is an XPWRITE command used for creating a redundant code (new parity) corresponding to the new data based on the intermediate data and performing a write with respect to a storage area of a storage address for a previous redundant code (old parity). The FMPK 160 that has received the XPWRITE command creates the new parity using the transmitted intermediate data and the old parity stored in the FMPK 160, and stores the new parity in a corresponding address. In Example 1, these commands include information with which whether an input-output target is user data or a redundant code is identifiable, and are examples of determination information.

Next, the computer system including the storage system according to Example 1 will be described in detail.

FIG. 1 is a hardware configuration diagram of the computer system according to Example 1.

The computer system includes one or more host computers (hereinafter, hosts) 30, a management computer 20, and the storage system 10. The host computer 30 and the storage system 10 are coupled via a network 50. The network 50 may be a local area network or may be a wide area network. The management computer 20 and the storage system 10 are coupled by an internal network 150. One or more external storage apparatuses 40 may be coupled to the storage system 10 via the network 50. The external storage apparatus 40 includes one or more storage devices. The storage device includes a non-volatile recording medium, e.g., magnetic disk, flash memory, or other semiconductor memories.

The host 30 is, for example, a computer that executes an application, and reads data utilized in the application from the storage system 10 or writes data created with the application in the storage system 10.

The management computer 20 is a computer used by an administrator for executing management processing that manages a computer system, and has an input device or a display device. The management computer 20 accepts the RAID level configuration with respect to a RAID group through an operation by the administrator with respect to the input device, and performs configuration with respect to the storage system 10 such that a RAID group is formed with the accepted RAID level.

The storage system 10 has one or more front-end packages (FEPKs) 100, one or more microprocessor packages (MPPKs) 120, one or more cache memory packages (CMPKs) 130, one or more back-end packages (BEPKs) 140, the internal network 150, and a plurality of flash packages (FMPKs) 160. The FEPK 100, the MPPK 120, the CMPK 130, and the BEPK 140 are coupled via the internal network 150. The storage controller 11 is formed by the FEPK 100, the MPPK 120, the CMPK 130, and the BEPK 140. The BEPK 140 is coupled with the FMPKs 160 via a plurality of line paths. The storage device coupled to the BEPK 140 is a non-volatile recording medium and may be, for example, a magnetic disk, flash memory, or other semiconductor memories (such as a phase-change memory (PRAM), resistance-change memory (ReRAM), or magnetoresistive memory (MRAM)).

The FEPK 100 is one example of an interface device and has one or more ports 101, an FE controller 112, and a buffer 113. The port 101 couples the storage system 10 with various apparatuses via the network 50 or the like. The FE controller 112 controls communication with the host computer 30.

The MPPK 120 has the microprocessor (MP) 121 as one example of a control device and a local memory (LM) 122. The MP 121 and the LM 122 are coupled via an internal bus 123. The LM 122 stores various programs or various information. The MP 121 executes the program stored in the LM 122 to execute various processing. The MP 121 transmits various commands (e.g., a READ command or a Write command in SCSI) to the FMPK 160 via the BEPK 140. The MP 121 transmits various commands to the external storage apparatus 40 via the FEPK 100. The creation processing of an redundant code is also implemented. For example, with respect to a data unit of a RAID group formed with RAID 5, the MP 121 creates a redundant code (parity) through exclusive disjunction (XOR) of a plurality of data elements forming the data unit. With respect to a data unit of a RAID group formed with RAID 6, the MP 121 creates a parity through exclusive disjunction of respective pieces of data after further multiplying a plurality of data elements forming the data unit with a predetermined coefficient. The MP 121 performs recovery processing of recovering one of data elements within a data unit based on one or more stripe data elements (at least one of data element and parity) for the data unit. The creation of parity may be performed by the MP 121 through execution of a program, or a parity creation circuit may be used.

The CMPK 130 has the cache memory (CM) 131 and a shared memory (SM) 132. The CM 131 temporarily stores data (write data) to be written in the FMPK 160 or the like from the host 30 or data (read data) read from the FMPK 160. The SM 132 stores information shared by a plurality of the MPPKs 120 when the MPPK 120 executes various processing.

The BEPK 140 has one or more ports 141, the BE controller 142, and the Buffer 143. The port 141 couples the storage system 10 and a storage device such as the FMPK 160. The BE controller 142 is, for example, a processor and performs data transfer between the CMPK 130 and the FMPK 160. The BEPK 140 may implement redundant code creation processing instead of the MP 121. In this case, a circuit for creating a redundant code may be within the BEPK 140 or may be separate from the BEPK 140.

The Buffer 143 temporarily stores data transmitted from the FMPK 160 or data to be transmitted to the FMPK 160.

The FMPK 160 stores data. The FMPK 160 has a compression and decompression function of executing compression processing and decompression processing. In the case where there has been a write request from the BEPK 140, write target data can be compressed and stored in the compressed state. In the case where there has been a read request from the BEPK 140, data stored in the compressed state in the FMPK 160 can be decompressed and transmitted to the BEPK 140. In the case where the FMPK 160 has received data from the storage controller 11, the data may be compressed and then stored in a flash chip 166, or it may be such that the data is temporarily stored in the flash chip 166 and the data is read from the flash chip 166 asynchronously with writing of the data from the storage controller 11 and compressed.

The storage controller 11 provides a logical volume to the host computer 30. A logical volume is formed based on a storage area of the plurality of FMPKs 160 included in a RAID group. A logical volume is allocated with a storage area in the entire logical address range of the logical volume.

The storage controller 11 can provide a virtual volume in accordance with thin provisioning to the host computer 30. At the stage of creation of the virtual volume, the volume capacity is defined and the address range of the virtual volume is configured, but a storage area is not allocated. Upon receiving a write request from the host computer 30, the storage controller 11 allocates a storage area (hereinafter referred to as chunk) of a predetermined size to an area of the virtual volume including an address designated in the write request, and writes data involved in the write request. A chunk is formed based on a storage area of the plurality of FMPKs 160 included in a RAID group. The storage controller 11 manages a plurality of chunks using a pool. A pool includes a chunk based on a plurality of RAID groups. That is, when the storage controller 11 receives a write request with respect to a virtual volume, a chunk is selected from the pool and allocated to the virtual volume. If the write request is for an address range in which a chunk is already allocated to the virtual volume, it is not necessary to newly allocate a chunk. Hereinafter, a logical volume and a virtual volume may be collectively referred to as volume.

Figure 2:
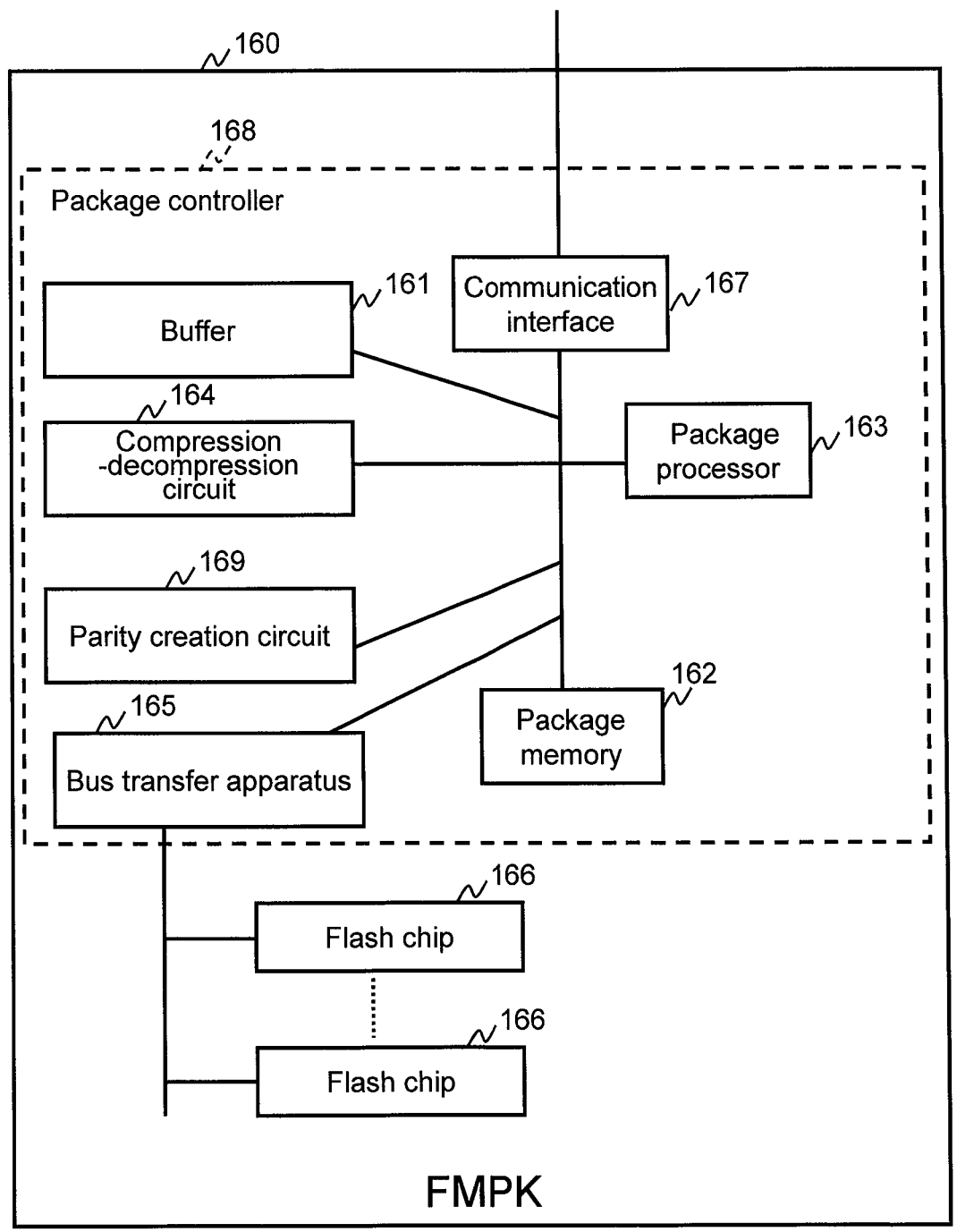
[FIG. 2]

FIG. 2 is a hardware configuration diagram of the FMPK according to Example 1.

The FMPK 160 has a package controller 168 and one or more flash chips 166. The package controller 168 has a Buffer 161, a package memory 162, a package processor 163 as one example of a device controller, a compression-decompression circuit 164, a bus transfer apparatus 165, a communication IF 167, and a parity creation circuit 169.

The communication IF 167 receives data transmitted from the BEPK 140. The Buffer 161 temporarily stores data transmitted from the BEPK 140 or data to be transmitted to the BEPK 140. The package memory 162 stores various programs or various information. The package processor 163 executes the program stored in the package memory 162 to execute various processing. For example, the package processor 163 causes execution of compression or decompression of data with the compression-decompression circuit 164. The package processor 163 causes the parity creation circuit 169 to execute creation (XOR operation) of a parity. With the bus transfer apparatus 165, the package processor 163 causes execution of data input or output for the flash chip 166. The flash chip 166 is one example of a recording medium and is a flash memory chip. The FMPK 160 provides a logical address space with respect to an external apparatus (the storage controller 11). The storage controller 11 designates a logical address in the logical address space and transmits a read/write command or the like to the FMPK 160.

The flash memory is a non-volatile semiconductor recording medium. The flash chip 166 has a plurality of blocks as physical storage areas, and each block is a unit for data erasure. Each block has a plurality of pages, and each page is a unit for a read/write of data. The flash memory has a characteristic of being not overwritable in the case of updating data stored in a page. Therefore, in the case of updating data, the package processor 163 writes data in a page (second page) different from a page (first page) in which data before update is stored. The package processor 163 maps a logical address range that has been mapped to the first page to the second page. Accordingly, the storage controller 11 can access data after update without needing to take into account the physical data storage position inside the FMPK 160, as long as a logical address provided by the FMPK 160 is accessed. In the package memory 162, conversion information (logical-physical mapping information) of a logical address and a physical page position (physical address) is stored.

Processing in the FMPK 160 will be described below with the package processor 163 as the main subject. However, the package controller 168 can also execute transfer of data within the FMPK 160 or compression/decompression processing of data.

Figure 3:
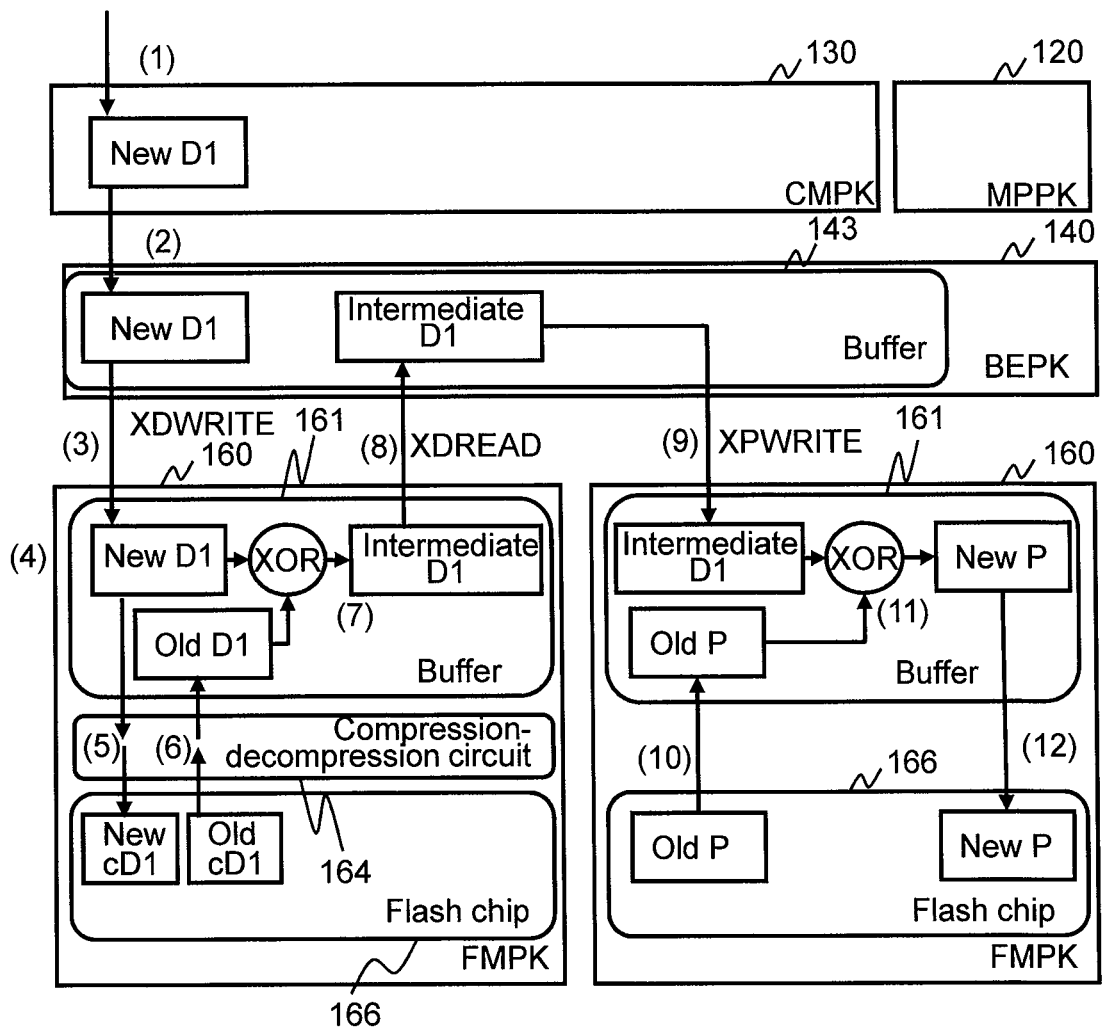
[FIG. 3]

FIG. 3 is a diagram showing an overview of parity creation processing at the time of a random write according to Example 1.

The host computer 30 designates a volume number of a logical volume provided by the storage controller 11 and an address on a volume, and transmits a write request involving write data. It is assumed that the write request is for updating data (old data) already stored in the volume. Based on the volume number and the address on the volume designated by the write request, the MP 121 identifies the FMPK 160 storing the data from among the plurality of FMPKs 160 forming a RAID group, and transmits the data to the FMPK 160.

In this example, the parity creation processing that has conventionally been executed by the storage controller 11 is executed by the FMPK 160. Accordingly, the load on the MP 121 that has controlled the parity creation processing is reduced, and the processing performance of the storage system 10 as a whole is improved. Further, by the FMPK 160 determining the necessity of data compression or decompression as described below, the performance degradation of the FMPK 160 due to compression or decompression is prevented. Processing involving parity creation and data compression or decompression by the FMPK 160 will be described below.

The MP 121 of the storage system 10 stores write data (user data: hereinafter referred to as new D1) transmitted from the host 30 in the CM 131 of the CMPK 130 via the FEPK 100 ((1) in FIG. 3). Next, the MP 121 transfers the new D1 to the Buffer 143 of the BEPK 140 ((2) in FIG. 3). Next, the BE controller 142 issues an XDWRITE command with respect to the FMPK 160 and transmits the new D1 ((3) in FIG. 3). The XDWRITE command is transmitted with a logical address corresponding to old data being designated.

The FMPK 160 that has received the XDWRITE command stores the transmitted new D1 in the Buffer 161 ((4) in FIG. 3). Since the received command is the XDWRITE command, the package processor 163 determines that the received new D1 is user data, and stores the new D1 in the flash chip 166 after compression with the compression-decompression circuit 164 ((5) in FIG. 3). Data into which new D1 is compressed is referred to as new cD1. Processing in which the new D1 is compressed and stored in the flash chip 166 may be implemented asynchronously with the reception of the XDWRITE command.

The package processor 163 decompresses, with the compression-decompression circuit 164, data (hereinafter, old cD1) stored in the flash chip 166 and into which data before update (old D1) corresponding to the new D1 is compressed, acquires the old D1, and stores the old D1 in the Buffer 161 ((6) in FIG. 3). Next, the package processor 163 creates intermediate data (hereinafter, intermediate D1 that may be called intermediate parity) utilized for creating a parity (redundant code) of a stripe column including D1 from the new D1 and the old D1 ((7) in FIG. 3). In this example, the package processor 163 creates the intermediate D1 through exclusive disjunction of the new D1 and the old D1.

Next, the MP 121 of the storage system 10 reads the intermediate D1 into the Buffer 143 of the BEPK 140 from the FMPK 160 by issuing an XDREAD command with respect to the FMPK 160 ((8) in FIG. 3). Specifically, the intermediate D1 is read from the Buffer 161 and transmitted to the BEPK 140 by the FMPK 160 that has received the XDREAD command. The BE controller 142 receives the intermediate D1 and writes the intermediate D1 in the Buffer 143 of the BEPK 140.

Next, for the intermediate D1, the MP 121 of the storage system 10 identifies the FMPK 160 storing a parity of a stripe column including the D1, designates a logical address corresponding to the old parity, issues an XPWRITE command, and transmits the intermediate D1. The FMPK 160 that has received the XPWRITE command stores the intermediate D1 in the Buffer 161 ((9) in FIG. 3). Since the received command is an XPWRITE command, the package processor 163 reads, into the Buffer 161, a parity before update (hereinafter, old P) of the stripe column including the old D1 that is stored in the flash chip 166 ((10) in FIG. 3). Next, the package processor 163 utilizes the intermediate D1 and the old P to create a parity (hereinafter, new P) corresponding to the new D1 ((11) in FIG. 3). In this example, the package processor 163 creates the new P through exclusive disjunction of the intermediate D1 and the old P.

Next, the package processor 163 determines that the received command is an XPWRITE command and that data created based on the command is a parity, and stores the created data, i.e., the new P, in the flash chip 166 without compression ((12) in FIG. 3).

Since the parity is stored in the flash chip 166 without compression in this manner, processing load in the FMPK 160 can be reduced. That is, decompression processing in reading of the old P (10) is unnecessary, and compression processing in writing processing of the new P (12) is unnecessary. When one of data elements included in a stripe column is updated, a parity of the stripe column is updated. Therefore, the frequency of reading/writing of parity is higher compared to user data, and a performance degradation prevention effect due to the corresponding compression/decompression processing not being performed is large. Meanwhile, since user data is compressed, the storage capacity used in the storage system 10 can be reduced. Although used for creation of the new parity, the intermediate parity is data that becomes unnecessary when the new parity is stored in the flash chip 166. When the intermediate parity is stored on a buffer and the new parity is created, the intermediate parity does not need to be stored in the flash chip 166. Therefore, the necessity of compressing the new parity is small, and the package processor 163 can reduce the overhead for compression processing by not compressing the intermediate parity.

This example is effective with respect to the parity creation processing for a random write in the case of compressing data. For example, in OLTP where a random write is relatively frequent, a cost reduction effect due to data compression and performance degradation prevention by compression can both be achieved.

Figure 4:
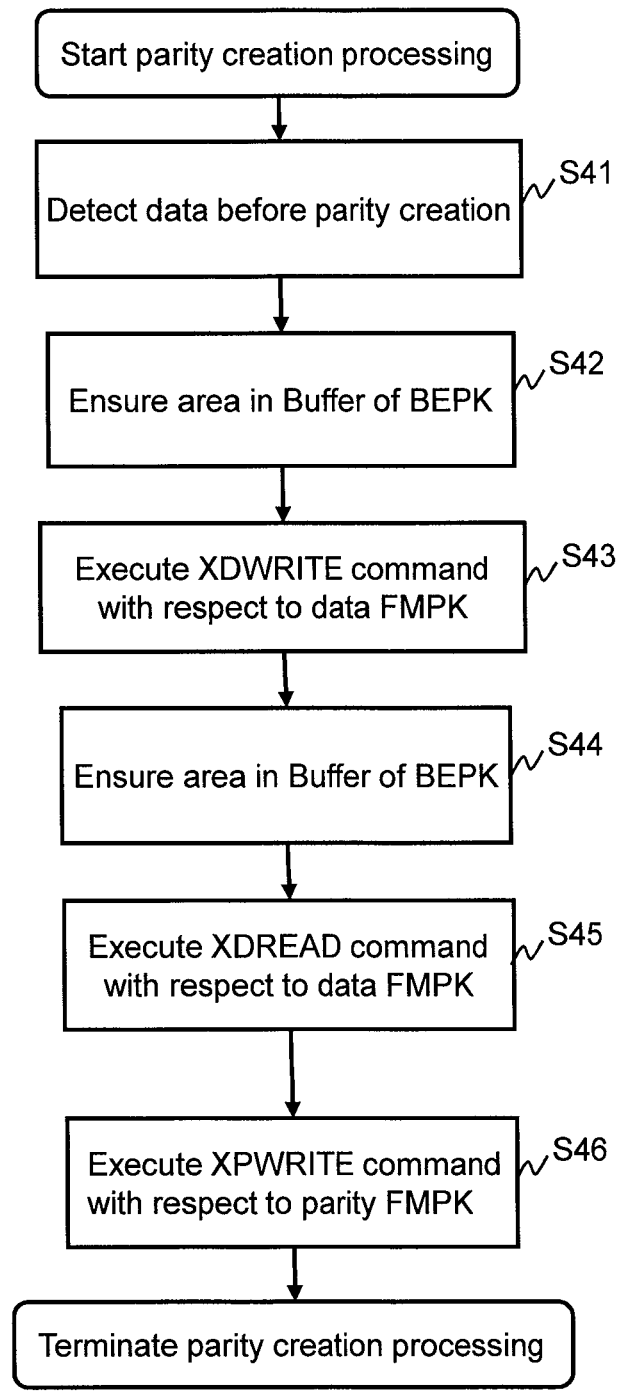
[FIG. 4]

FIG. 4 is a flowchart of the parity creation processing at the time of a random write according to Example 1.

The parity creation processing at the time of a random write is executed in order to perform creation of a parity that becomes necessary depending on the update of data, when write data transferred from the host 30 that is stored in the CM 131 by the MP 121 is to be stored in a storage device such as the FMPK 160.

In the parity creation processing, the MP 121 detects write data (new data) for which creation of a parity is not implemented from the CM 131 (S41). Next, the MP 121 ensures an area in the Buffer 143 of the BEPK 140 in order to transfer the new data to the FMPK 160, and stores the new data therein (S42). Next, the MP 121 executes an XDWRITE command with respect to the FMPK 160 (data FMPK) storing data before update (old data) corresponding to the new data (S43). Accordingly, the data FMPK that has received the XDWRITE command executes XDWRITE processing (see FIG. 5), performs an XOR operation using the old data and the new data, and creates and stores, in the Buffer 161 of the FMPK 160, intermediate data for creating a parity. The details of the XDWRITE processing will be described later.

Next, the MP 121 ensures an area in the Buffer 143 in order to acquire the intermediate data from the FMPK 160 (S44). Next, the MP 121 executes an XDREAD command with respect to the data FMPK (S45). Accordingly, the data FMPK that has received the XDREAD command executes XDREAD processing (see FIG. 6) and transmits the intermediate data to the BEPK 140. Accordingly, the intermediate data is stored in the Buffer 143 of the BEPK 140. The details of the XDREAD processing will be described later.

Next, the MP 121 issues an XPWRITE command with respect to the FMPK 160 (parity FMPK) storing a parity of a stripe column corresponding to the new data, transmits the intermediate data stored in the Buffer 143 (S46), and terminates the parity creation processing. In the parity FMPK that has received the XPWRITE command, XPWRITE processing (see FIG. 7) of creating a parity based on the intermediate data is executed. The details of the XPWRITE processing will be described later.

Figure 5:
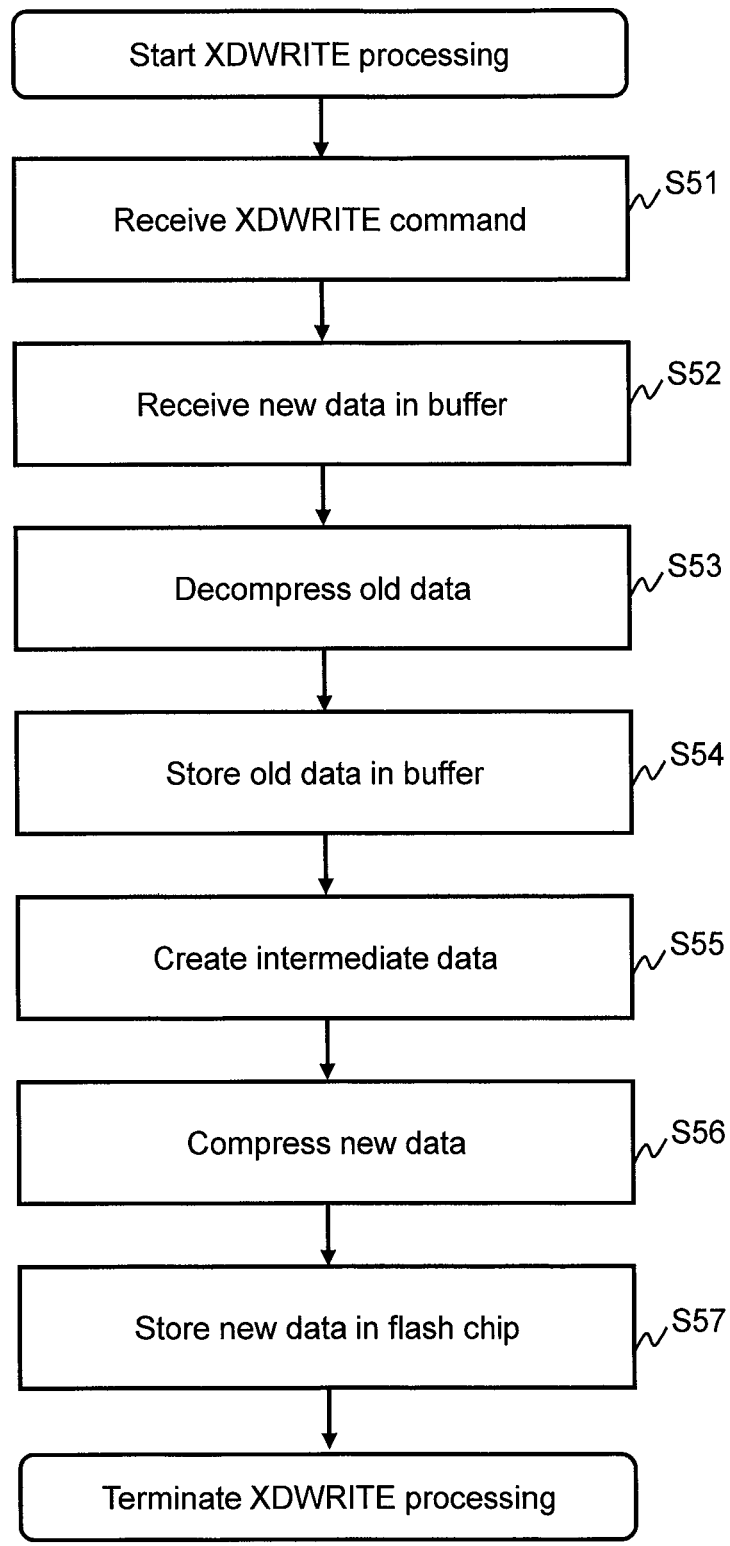
[FIG. 5]

FIG. 5 is a flowchart of XDWRITE processing according to Example 1.

The XDWRITE processing is executed when the FMPK 160 has received the XDWRITE command from the MP 121.

In the XDWRITE processing, the package processor 163 of the FMPK 160 stores write data (new data) transferred by the MP 121 in the Buffer 161 (S52), when the FMPK 160 receives the XDWRITE command from the MP 121 (S51). Next, the package processor 163 determines from the XDWRITE command that data (new data) as a target of command is user data, and decompresses, with the compression-decompression circuit 164, data stored in the flash chip 166 into which old data (old data) corresponding to the write data is compressed (S53). Next, the package processor 163 stores the decompressed old data in the Buffer 161 (S54). Next, the package processor 163 creates intermediate data through an XOR operation of the new data and the old data (S55). Next, the package processor 163 determines from the XDWRITE command that the data (new data) as a target of command is user data, and compresses the new data with the compression-decompression circuit 164 (S56). Next, the package processor 163 stores the compressed new data in the flash chip 166 (S57). Accordingly, the user data is compressed and stored in the flash chip 166. The compression or decompression processing of data may be performed by the package processor 163 without using the dedicated compression-decompression circuit 164. The XOR operation may be implemented using a dedicated circuit.

Figure 6:
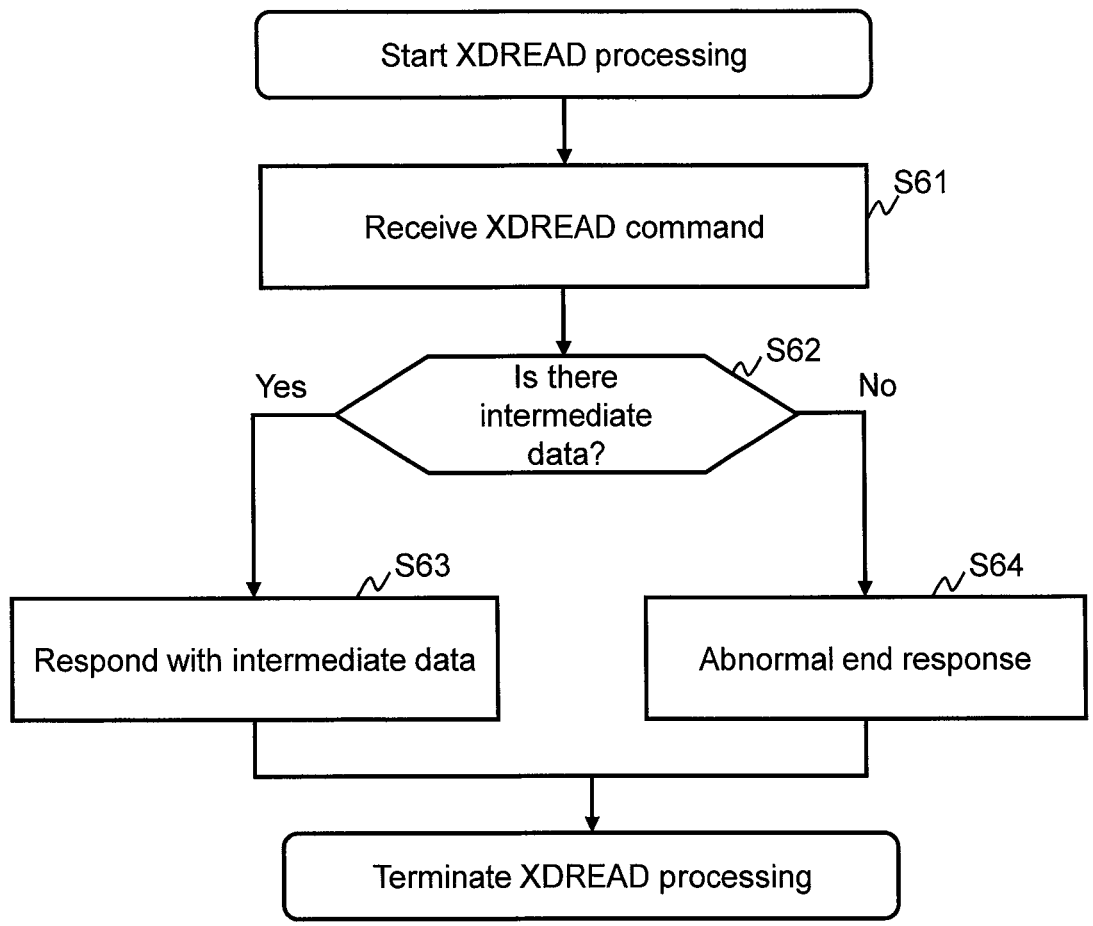
[FIG. 6]

FIG. 6 is a flowchart of XDREAD processing according to Example 1.

The XDREAD processing is executed when the FMPK 16 has received the XDREAD command from the MP 121.

When the FMPK 160 receives the XDREAD command (S61), the package processor 163 of the FMPK 160 determines whether or not there is intermediate data in an area of the Buffer 161 corresponding to an address designated by the XDREAD command (S62). In the case where the intermediate data exists as a result (S62: Yes), the package processor 163 responds with the intermediate data in the Buffer 161 to the MP 121, and terminates the XDREAD processing. On the other hand, in the case where the intermediate data does not exist (S62: No), a response is made to the MP 121 with an abnormal end response (S64), and the XDREAD processing is terminated.

Figure 7:
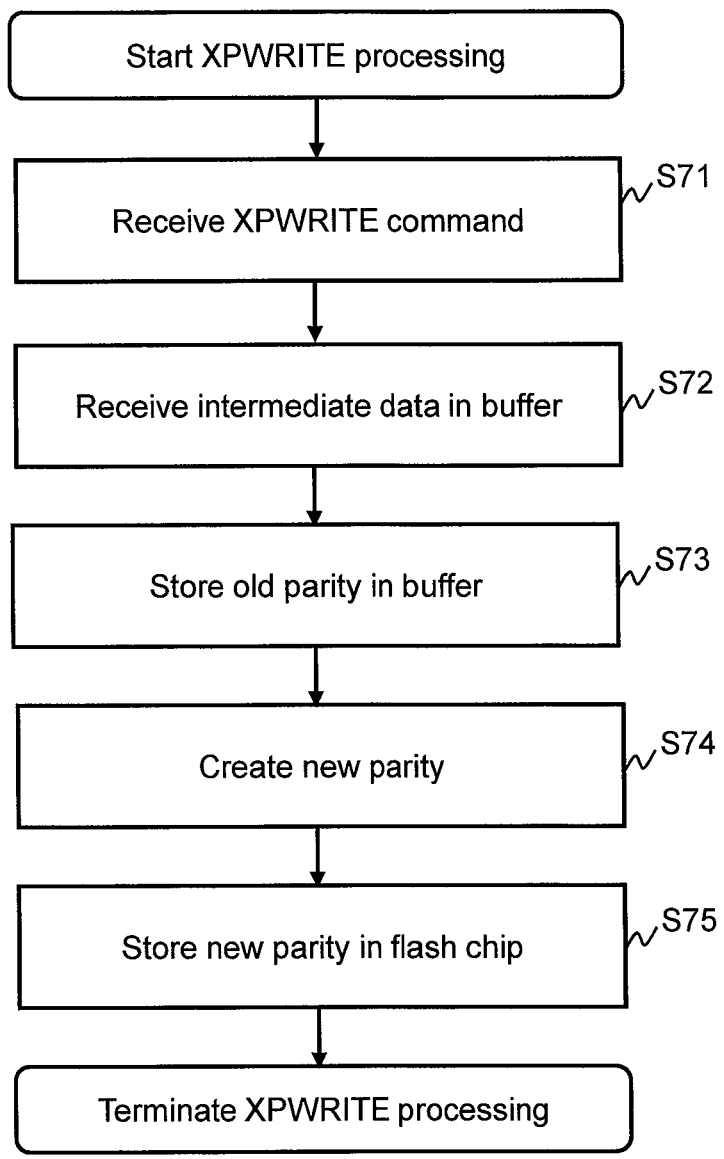
[FIG. 7]

FIG. 7 is a flowchart of XPWRITE processing according to Example 1.

The XPWRITE processing is executed when the FMPK 160 has received the XPWRITE command from the MP 121.

When the FMPK 160 receives the XPWRITE command (S71), the package processor 163 of the FMPK 160 stores the intermediate data transferred by the MP 121 in the Buffer 161 (S72). Next, since the received command is an XPWRITE command and thus an input-output target is a redundant code that does not need decompression, the package processor 163 stores, in the Buffer 161, an old redundant code (old parity) from the flash chip 166 without decompression (S73). Next, the package processor 163 creates a new parity through an XOR operation of the intermediate data and the old parity (S74). Next, since the received command is an XPWRITE command and thus an input-output target is a redundant code that does not need compression, the package processor 163 stores the created new parity in the flash chip 166 without compression (S75).

With this example, the storage device (FMPK 160 in this example) can acknowledge whether or not input-output target data is a redundant code from the type of command issued from the storage controller 11, and the input-output target data can be stored uncompressed in a storage medium in the case of a redundant code. Therefore, processing load on the storage device at the time of a random write can be reduced, and the random write performance can be improved. Since the redundant code is created by the storage device, processing load on the storage controller 11 can be reduced.

Although compression-decompression processing is given as an example of addition processing executed by the storage device in Example 1, the addition processing is not limited to this and may be processing in which the state of input-output data is changed or processing in which predetermined data (guarantee code or the like) is added to input-output target data. For example, the addition processing may be encryption processing in which input-output target data is encrypted. Whether or not to execute processing of determining whether or not to execute the addition processing may be indicated from the management computer 20 as ON/OFF.

EXAMPLE 2

Next, a computer system according to Example 2 will be described. The computer system according to Example 2 is basically similar to the computer system according to Example 1 shown in FIG. 1. In the computer system according to Example 2, the storage controller 11 transfers determination information for determining whether or not it is a redundant code to a storage device (e.g., FMPK 160), and the storage device determines whether or not it is a redundant code based on the determination information transferred from the storage controller 11.

Figure 8:
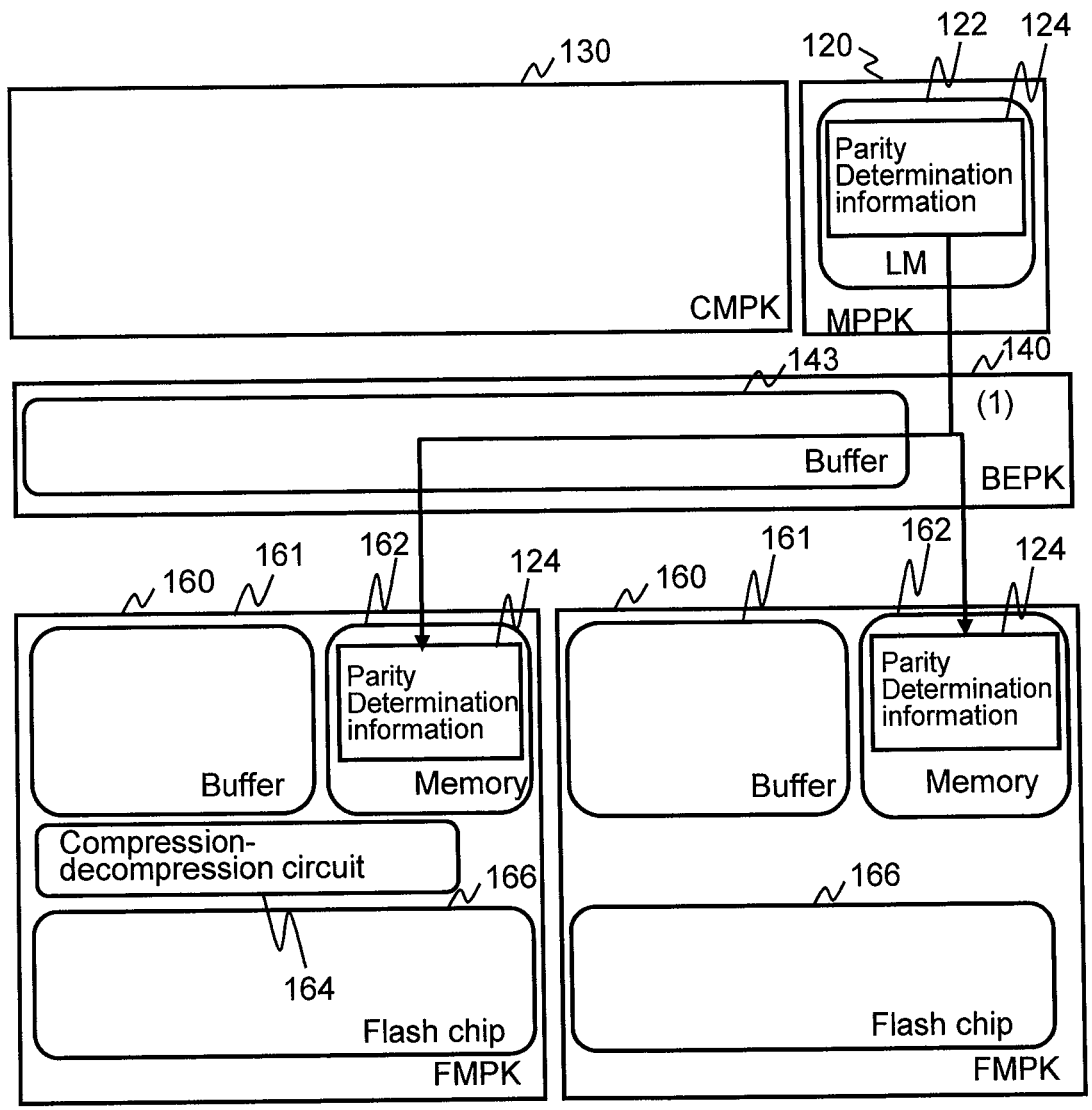
[FIG. 8]

FIG. 8 is a diagram showing an overview of parity determination information registration processing according to Example 2.

The parity determination information registration processing is executed in the storage system 10 before IO processing is executed by the host 30, for example. Parity determination information 124 (see FIG. 9) is, for example, created in advance and stored in the LM 122.

The MP 121 of the MPPK 120 of the storage controller 11 transfers the parity determination information 124 stored in the LM 122 to each FMPK 160. It suffices that the parity determination information 124 transmitted to each FMPK 160 include information on an area managed by the FMPK 160. The FMPK 160 stores the transferred parity determination information 124 in the package memory 162 ((1) in FIG. 8). When an IO command is issued with respect to the FMPK 160, the parity determination information 124 is utilized in determining whether or not data that is a target of the IO command is a redundant code.

Figure 9:
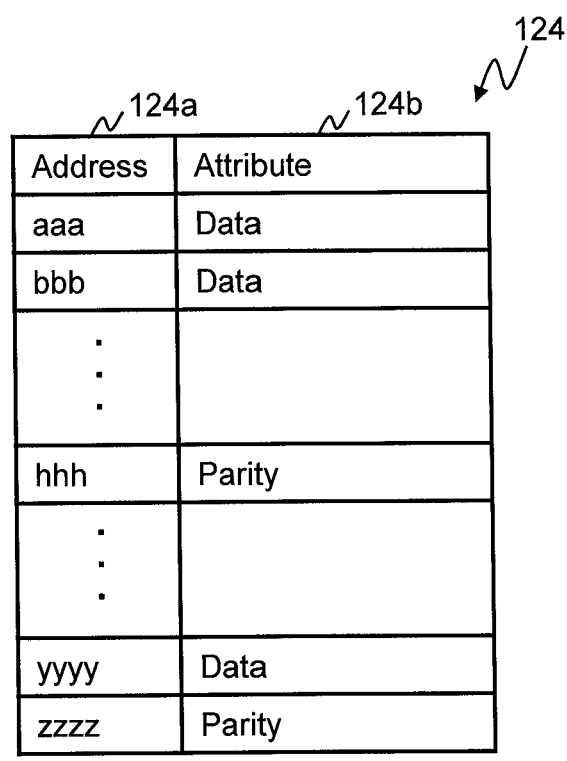
[FIG. 9]

FIG. 9 is a configuration diagram of one example of the parity determination information according to Example 2.

The parity determination information 124 is information that shows, for each address of each stripe of a logical volume (logical VOL), whether or not data of the stripe is a redundant code. The parity determination information 124 includes an address field 124a and an attribute field 124b. The address field 124a stores a starting address for each fixed size (stripe) from the start to end of the logical volume. The address field 124a may store a start address and an end address of the stripe. The attribute field 124b stores a value showing whether or not data stored in a stripe corresponding to the starting address of the address field 124a is a redundant code. For example, the attribute field 124b stores "data" in the case where the data stored in the stripe is user data, and the attribute field 124b stores "parity" in the case where the data stored in the stripe is a redundant code.

The parity determination information may hold an entry for a plurality of stripes in a partial area of the logical VOL and a repetition number thereof, instead of holding an entry for stripes of the entire logical VOL.

Although it has been assumed that the parity determination information 124 is transmitted to the FMPK 160 from the storage controller 11, it may be such that a RAID configuration and a drive position in the RAID configuration is notified from the storage controller 11 and the FMPK 160 creates the parity determination information 124 based on the RAID configuration and the drive position. The parity determination information 124 (or only information therein on an area corresponding to the target of an IO command) may be embedded with respect to an IO command or with respect to transfer data that is the target of the IO command at the time of issuance of the IO command, and notified to the FMPK 160, instead of the parity determination information 124 being registered in the FMPK 160 from the storage controller 11 in advance.

Figure 10:
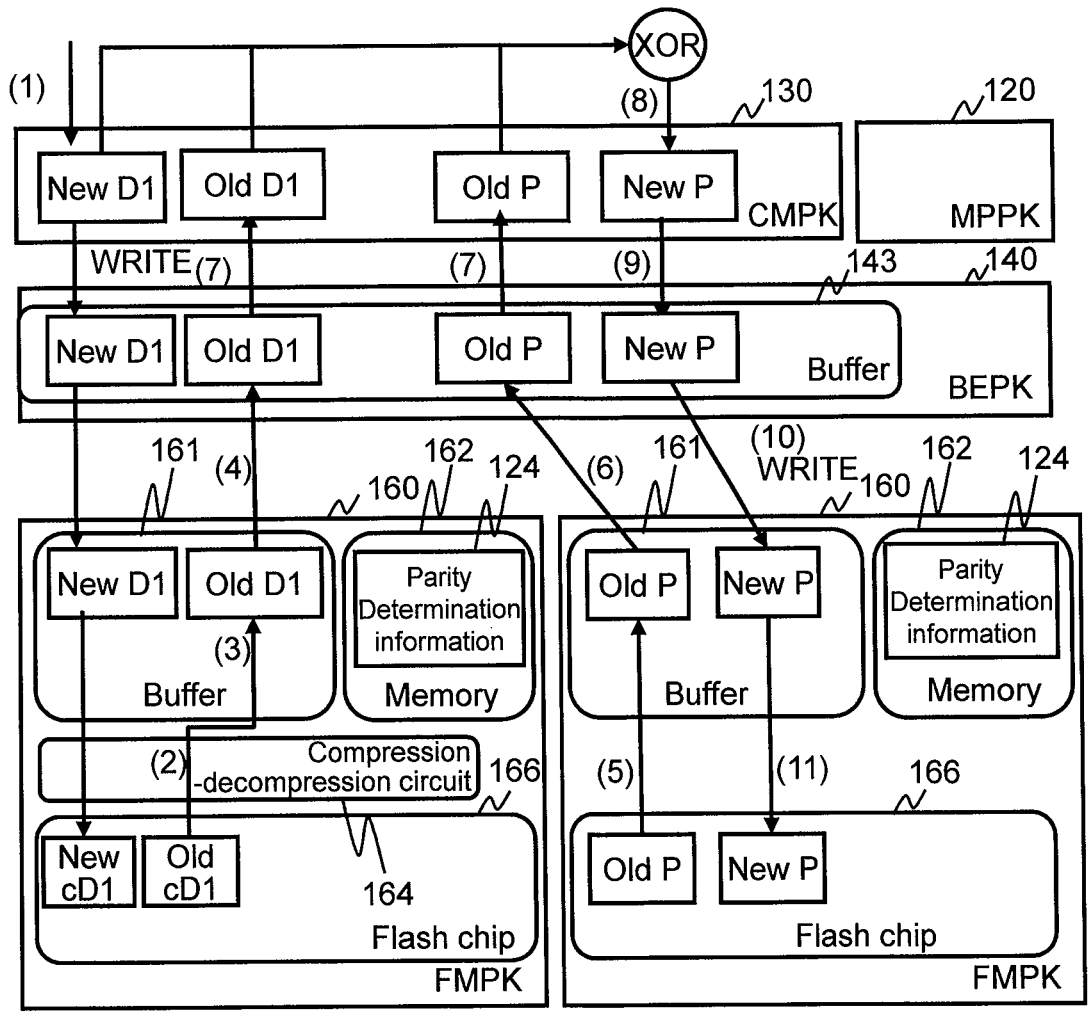
[FIG. 10]

FIG. 10 is a diagram showing an overview of RMW parity creation processing according to Example 2.

The MP 121 of the storage system 10 stores write data (hereinafter, new D1) received from the host 30 in the CM 131 of the CMPK 130 via the FEPK 100 ((1) in FIG. 10). The MP 121 issues a READ command to read old data (hereinafter, old D1) stored in the same address as the new D1 to the FMPK 160, and reads the old D1 ((2), (3), and (4) in FIG. 10). Specifically, the FMPK 160 that has received the READ command determines whether or not the old D1 is a redundant code based on the parity determination information 124 stored in the package memory 162. Since the old D1 is determined as not a redundant code, the FMPK 160 determines that the old D1 is compressed and stored in the flash chip 166. Data into which the old D1 is compressed is old cD1. The FMPK 160 decompresses the old cD1 stored in the flash chip 166 with the compression-decompression circuit 164 to acquire the old D1 ((2) in FIG. 10). The old D1 is stored in the Buffer 161 ((3) in FIG. 10) and transferred to the Buffer 143 of the BEPK 140 designated in the READ command ((4) in FIG. 10).

Next, the MP 121 issues a READ command to read a redundant code (hereinafter, old P) corresponding to the old D1 to the FMPK 160 storing the old P, and reads the old P ((5) and (6) in FIG. 10). Specifically, the FMPK 160 that has received the READ command determines from the parity determination information 124 that the old P is a redundant code, and determines that the old P is stored in the flash chip 166 without compression. With the FMPK 160, the old P from the flash chip 166 is stored in the Buffer 161 without decompression ((5) in FIG. 10) and transferred to the Buffer 143 of the BEPK 140 designated in the READ command ((6) in FIG. 10).

Next, with the MP 121, data (old D and old P) stored in the Buffer 143 by the FMPK 160 is read into the CMPK 130 ((7) in FIG. 10), and a new redundant code (new P) corresponding to the new D1 is created through an XOR operation of the new D1, the old D1, and the old P and stored in the CMPK 130 ((8) in FIG. 10).

The MP 121 transfers the new P of the CMPK 130 to the Buffer 143 of the BEPK 140 ((9) in FIG. 10), and issues a WRITE command to the FMPK 160 ((10) in FIG. 10). The FMPK 160 that has received the WRITE command stores the new P in the Buffer 161. Next, with the FMPK 160, the new P is determined from the parity determination information 124 as a redundant code and determined to be stored in the flash chip 166 without compression. With the FMPK 160, the new P is taken out from the Buffer 161 and stored in the flash chip 166 without compression ((11) in FIG. 10).

With this processing, the old P that is a redundant code can be read without decompression to reduce processing load on the storage device, and the new P can be written without compressing the new P to reduce processing load on the storage device.

Figure 11:
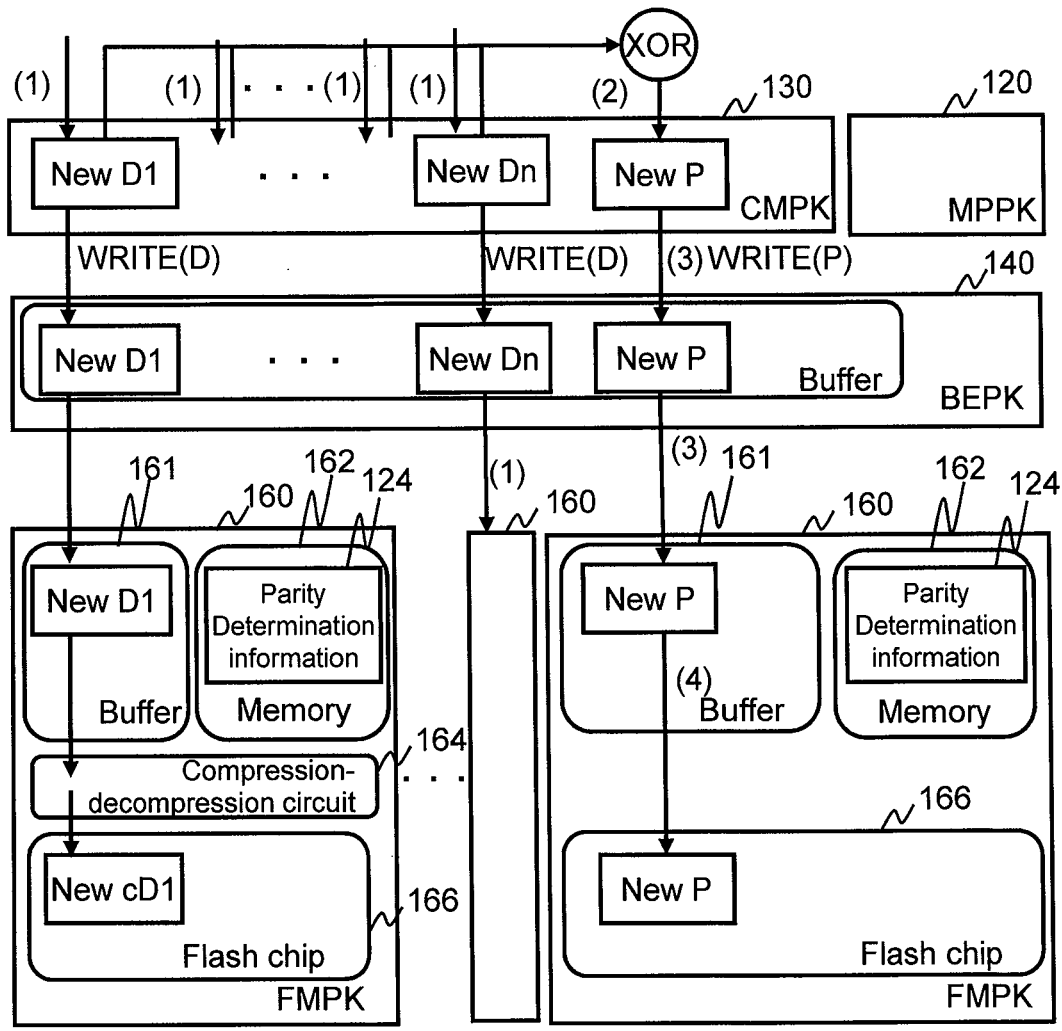
[FIG. 11]

FIG. 11 is a diagram showing an overview of all-stripe parity creation processing according to Example 2.

The all-stripe parity creation processing is processing of creating a redundant code that is executed in the case where all data in a stripe column is stored in the CMPK 130.

The MP 121 of the storage system 10 stores write data (hereinafter, new D1 to new Dn) received from the host 30 in the CM 131 of the CMPK 130 via the FEPK 100 ((1) in FIG. 11). With the MP 121, a redundant code (new P) corresponding to the write data is created by implementing an XOR operation using all of data (new D1 to new Dn) forming the same stripe column, and stored in the CMPK 130 ((2) in FIG. 11).

The MP 121 issues a WRITE command to WRITE the new P with respect to the FMPK 160 via the BEPK 140 ((3) in FIG. 11). The FMPK 160 that has received the WRITE command stores the new P in the Buffer 161. The FMPK 160 determines from the parity determination information 124 that the new P is a redundant code, and determines to store the new P in the flash chip 166 without compression. The FMPK 160 stores the new P in the flash chip 166 without compression ((4) in FIG. 11).

With this processing, the new P can be written without compressing the new P to reduce processing on the storage device.

Figure 12:
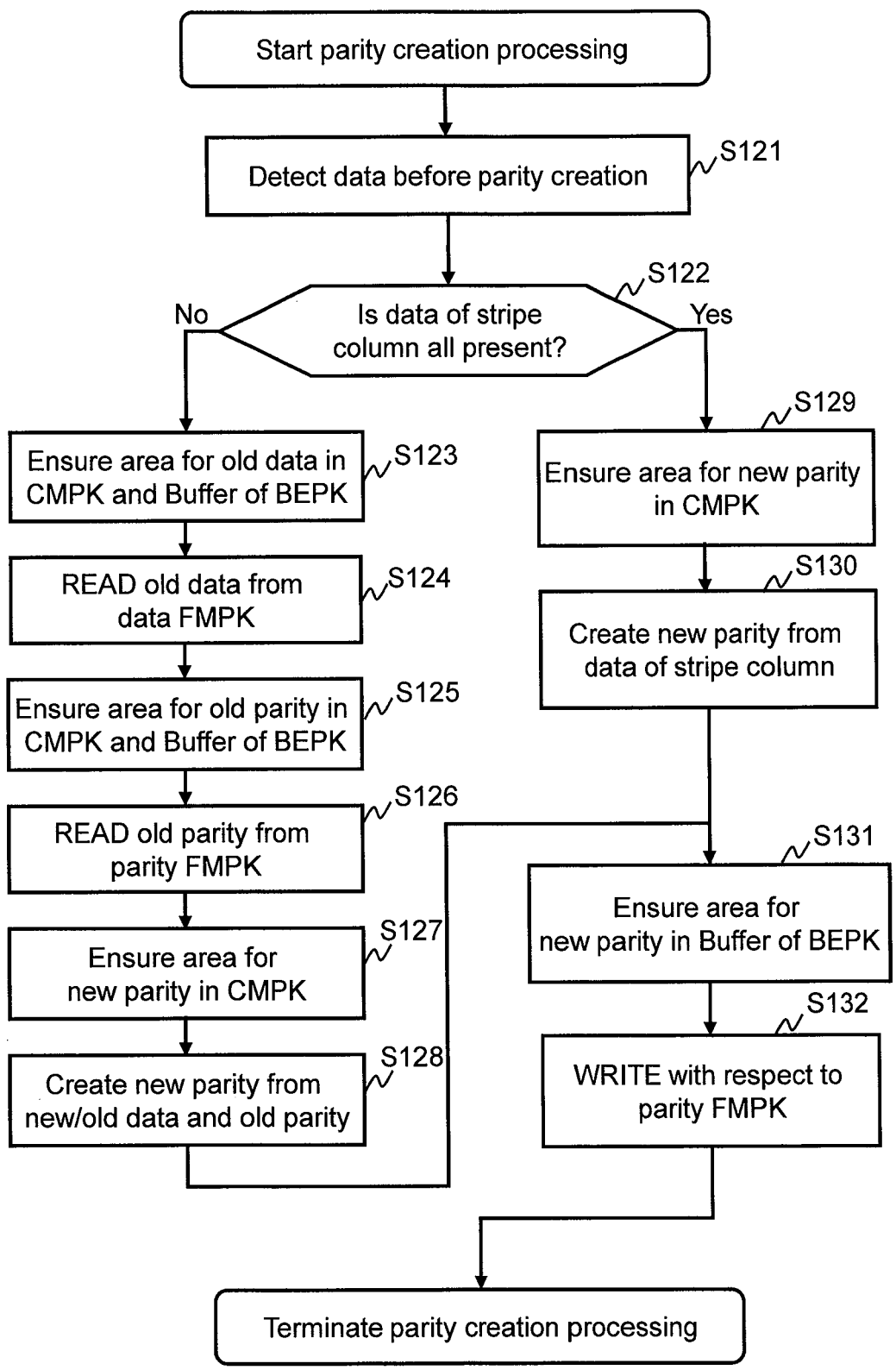
[FIG. 12]

FIG. 12 is a flowchart of parity creation processing according to Example 2.

In the parity creation processing, a creation method for a redundant code is changed depending on whether or not all of data of the same stripe column is present. In the case where all of data of the same stripe column is present, the all-stripe write parity creation processing shown in FIG. 11 is implemented. On the other hand, in the case where all of data of the same stripe column is not present, the RMW parity creation processing shown in FIG. 10 is implemented.

In the parity creation processing, the MP 121 first detects data (hereinafter, new D) before parity creation from within the CMPK 130 (S121). Next, the MP 121 determines whether data of a stripe column to which the new D belongs is all stored within the CMPK 130 (S122).

In the case where all of the data of the stripe column to which the new D belongs is present within the CMPK 130 as a result (S122: Yes), the MP 121 ensures an area in the CMPK 130 to store a redundant code (new P) corresponding to the new D (S129). Next, with the MP 121, the new P is created by an XOR operation of all of data in the stripe column to which the new D belongs that is in the CMPK 130, and stored in the area ensured in the CMPK 130 (S130). Next, the MP 121 ensures an area for the new P in the Buffer 143 of the BEPK 140, and stores the new P in the area (S131). Next, the MP 121 issues a WRITE command to WRITE the new P with respect to the FMPK 160 storing a redundant code corresponding to the stripe column (S132). Accordingly, in the FMPK 160, WRITE processing (see FIG. 14) is executed, and the new P is stored.

On the other hand, in the case where all of the data in the stripe column to which the new D belongs is not present within the CMPK 130 (S122: No), the MP 121 ensures an area in the CMPK 130 and the Buffers 131 and 143 of the BEPK 140 to store data (hereinafter, old D) before update of the new D (S123). Next, the MP 121 issues a READ command to READ the old D with respect to the FMPK 160 storing the old D (S124). Accordingly, in the FMPK 160, READ processing (see FIG. 13) is executed, and the old D is stored in the CMPK 130 and the Buffers 131 and 143 of the BEPK 140.

Next, the MP 121 ensures an area in the CMPK 130 and the Buffers 131 and 143 of the BEPK 140 to store a redundant code (hereinafter, old P) corresponding to the old D (S125). Next, the MP 121 issues a READ command to READ the old P with respect to the FMPK 160 storing the old P (S126). Accordingly, in the FMPK 160, READ processing (see FIG. 13) is executed, and the old P is stored in the CMPK 130 and the Buffers 131 and 143 of the BEPK 140.

Next, the MP 121 ensures an area to store the new P in the CMPK 130 (S127). Next, with the MP 121, the new P is created by an XOR operation of the new D, the old D, and the old P, and stored in the ensured area (S128). Next, the MP 121 ensures an area to store the new P in the Buffer 143 of the BEPK 140 (S131). Next, the MP 121 issues a WRITE command to WRITE the new P with respect to the FMPK 160 storing a redundant code corresponding to the stripe column (S132). Accordingly, in the FMPK 160, WRITE processing (see FIG. 14) is executed, and the new P is stored.

Figure 13:
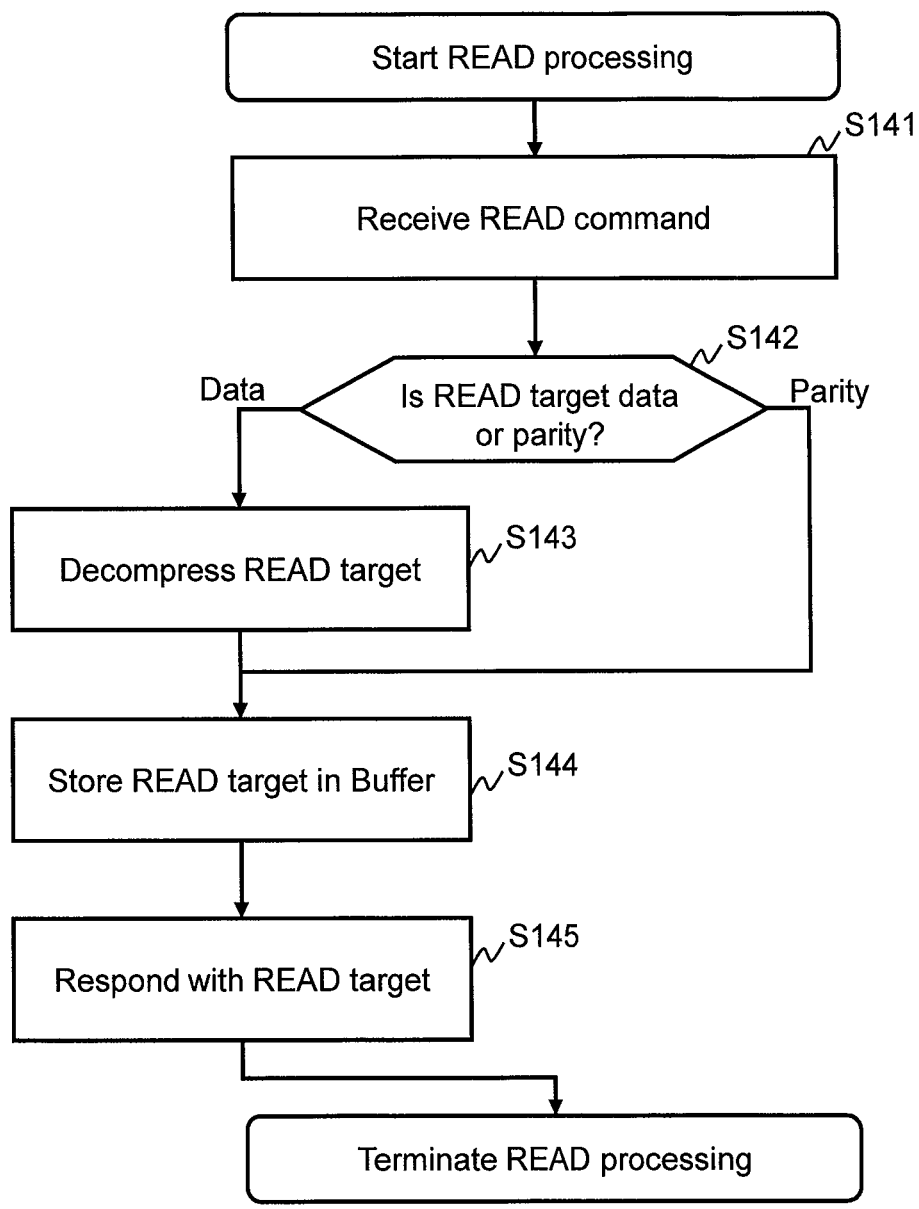
[FIG. 13]

FIG. 13 is a flowchart of the READ processing according to Example 2.

The READ processing is processing executed by the FMPK 160 that has received a READ command.

Upon receiving the READ command (S141), the FMPK 160 uses the parity determination information 124 stored in the package memory 162 and a READ target address within the READ command to determine whether or not a READ target is a redundant code (parity) (S142).

In the case where it is determined that the READ target is not a redundant code as a result, i.e., in the case where the READ target is data (user data) (S142: data), the FMPK 160 determines that the READ target, not being a redundant code, is compressed and stored in the flash chip 166, and decompresses READ target data with the compression-decompression circuit 164 (S143). Next, the FMPK 160 stores the decompressed READ target data in the Buffer 161 (S144), and transmits the data with respect to the BEPK 140 (S145).

On the other hand, in the case where it is determined that the READ target is a redundant code (S142: parity), the FMPK 160 determines that the READ target, being a redundant code, is stored in the flash chip 166 without compression, and stores the redundant code as the READ target in the Buffer 161 from the flash chip 166 without decompression (S144). Next, the FMPK 160 transmits a redundant code as the read target in the Buffer 161 with respect to the BEPK 140 (S145).

With this READ processing, a redundant code can be read without decompression to reduce processing load on the storage device.

Figure 14:
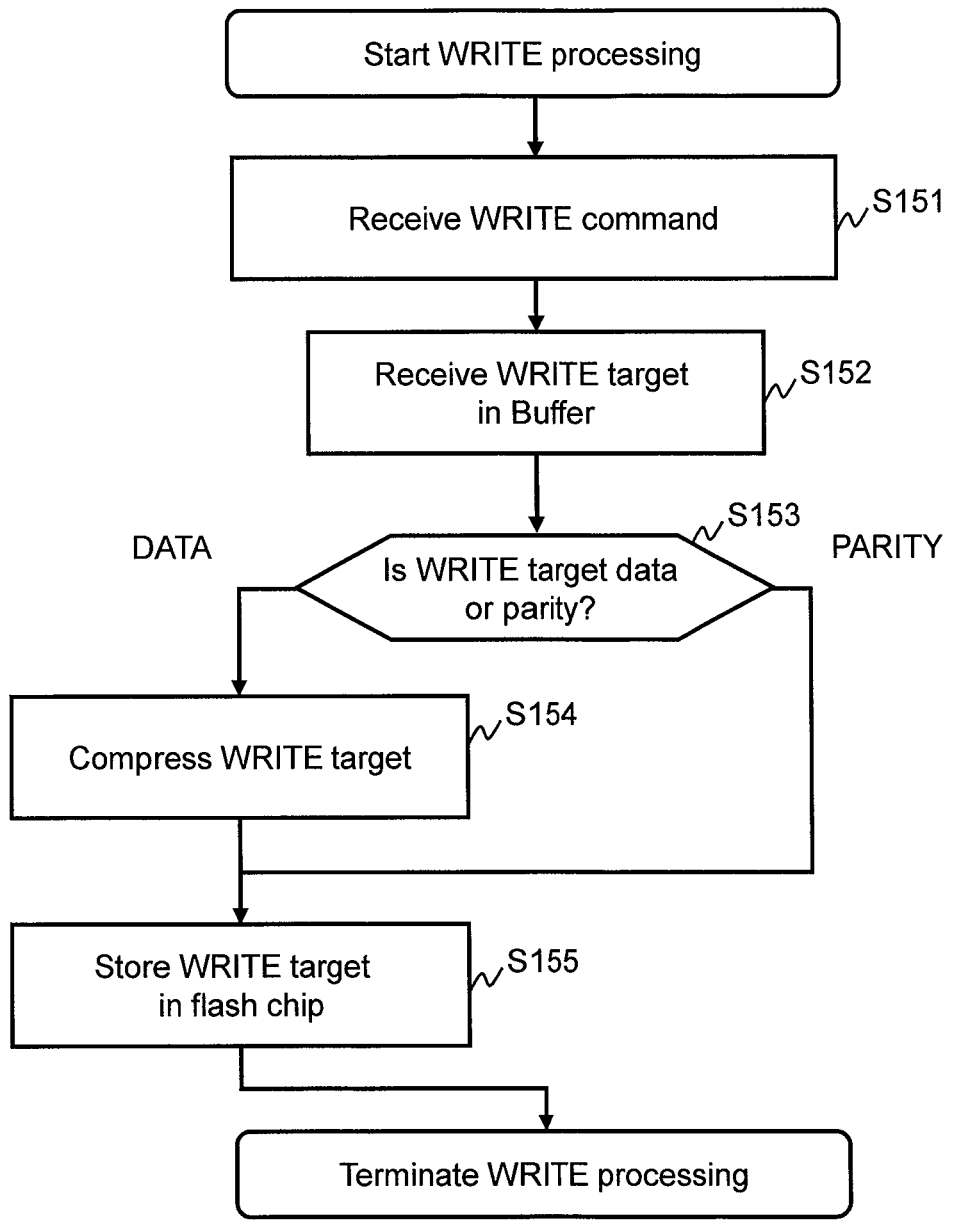
[FIG. 14]

FIG. 14 is a flowchart of WRITE processing according to Example 2.

The WRITE processing is processing executed by the FMPK 160 that has received a WRITE command.

First, upon receiving the WRITE command (S151), the FMPK 160 stores WRITE target data (user data or redundant code) in the Buffer 161 (S152). Next, the FMPK 160 uses the parity determination information 124 stored in the package memory 162 and an address of a WRITE target within the WRITE command to determine whether or not the WRITE target data is a redundant code (S153).

In the case where it is determined that the WRITE target is not a redundant code as a result, i.e., in the case where the WRITE target is data (user data) (S153: data), the FMPK 160 determines that the WRITE target, not being a redundant code, is compressed and stored in the flash chip 166, compresses the WRITE target data with the compression-decompression circuit 164 (S154), and stores the WRITE target data in the flash chip 166 (S155).

On the other hand, in the case where it is determined that the WRITE target is a redundant code (S153: parity), the FMPK 160 determines that the WRITE target, being a redundant code, is stored in the flash chip 166 without compression, and stores the redundant code in the flash chip 166 without compression (S155).

With this WRITE processing, a redundant code can be written without compression to reduce processing load on the storage device.

Figure 15:
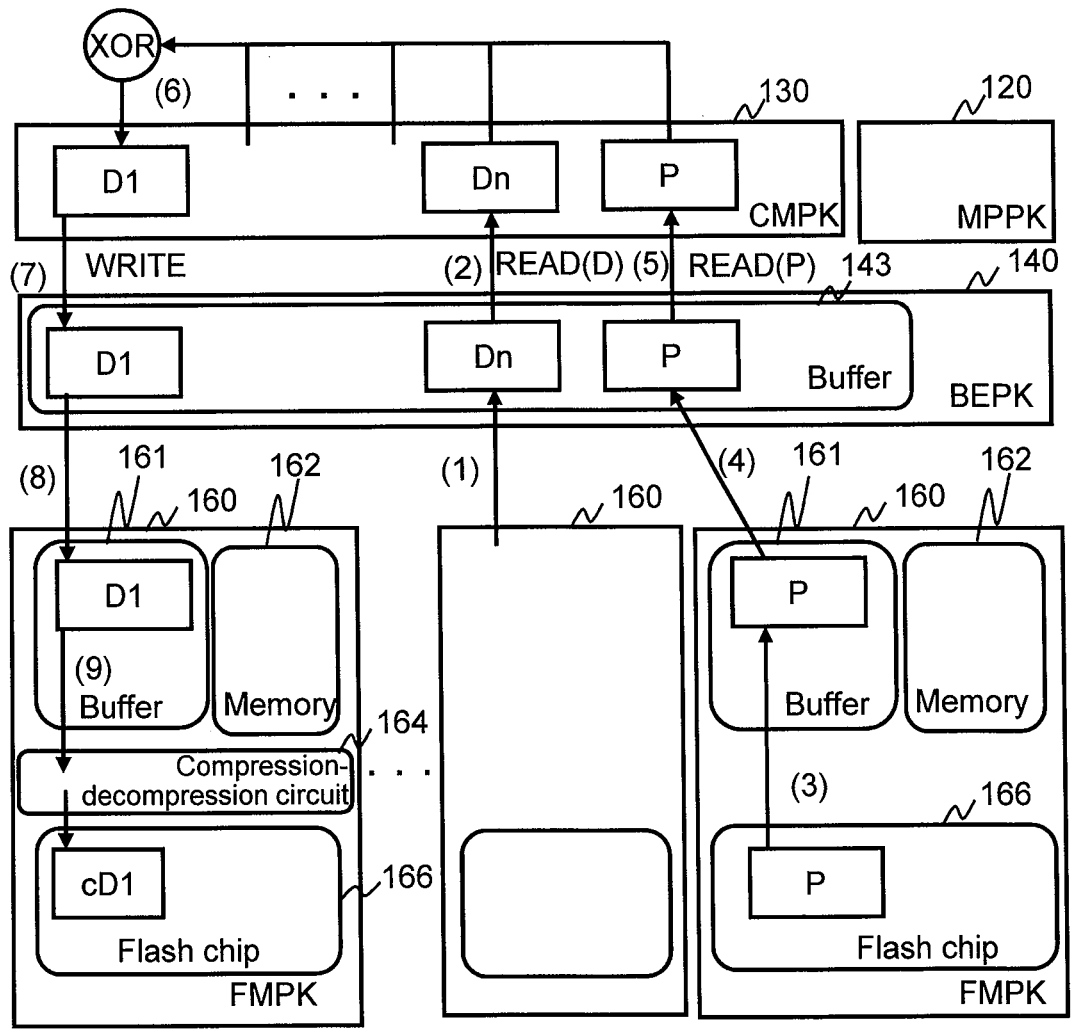
[FIG. 15]

FIG. 15 is a diagram showing an overview of collection copy processing according to Example 2.

The collection copy processing is processing that is executed in order to recover data stored in a failed storage device, when a part of storage devices forming a RAID group has failed.

First, with the MP 121, a READ command to READ data (hereinafter, D2 to Dn) and a redundant code (hereinafter, P) of a stripe column including recovery target data (hereinafter, D1) is issued to each FMPK 160, and the D2 to Dn and the P are acquired from the FMPK 160 and stored in the CMPK 130 ((1) to (5) in FIG. 15). Next, the MP 121 recovers the D1 by an XOR operation of the data (D2 to Dn) and the P stored in the CMPK 130 ((6) in FIG. 15). Next, the MP 121 issues a WRITE command to WRITE the D1 with respect to the spare FMPK 160 in which the D1 is to be stored ((7) and (8) in FIG. 15). Accordingly, in the FMPK 160, the WRITE processing is executed, and the D1 is compressed and stored in the flash chip 166 ((9) in FIG. 15). The READ processing and the WRITE processing executed with the FMPK 160 that has received a READ/WRITE command issued in the collection copy processing are as shown in FIG. 13 and FIG. 14.

Figure 16:
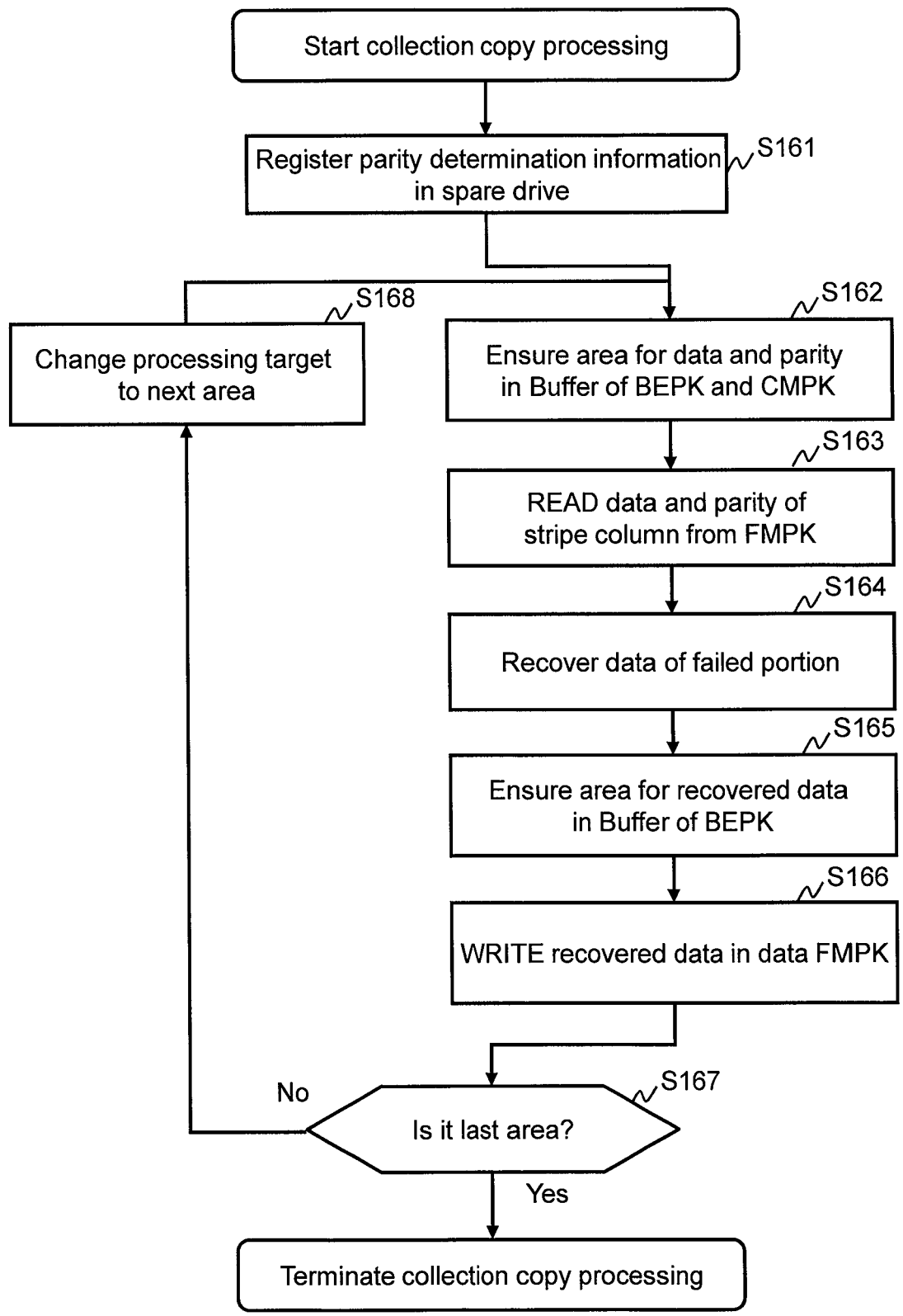
[FIG. 16]

FIG. 16 is a flowchart of the collection copy processing according to Example 2. FIG. 16 is a flowchart with which the collection copy processing shown in FIG. 15 is realized.

First, the MP 121 registers the parity determination information 124 with respect to the spare FMPK 160 with a method shown in FIG. 8 (S161). Next, the MP 121 ensures an area to store the data and the redundant code of the stripe column in the Buffer 143 of the BEPK 140 and the CMPK 130 (S162). Next, the MP 121 issues, to each FMPK 160, a READ command to READ the data (hereinafter, D2 to Dn) and the redundant code (hereinafter, P) of the stripe column in which a processing target is present, excluding the data (hereinafter, D1) that has been stored in the FMPK 160 in which a failure has occurred (S163). Accordingly, in the FMPK 160, the READ processing (see FIG. 13) is executed, and the D2 to Dn and the P are stored in the CMPK 130 and the Buffers 131 and 143 of the BEPK 140.

Next, the MP 121 recovers the D1 that has been stored in the failed FMPK 160 by an XOR operation of the D2 to Dn and the P (S164). Next, the MP 121 ensures an area for storage in the Buffer 143 of the BEPK 140 and stores the D1 (S165). Next, the MP 121 issues a WRITE command to WRITE the recovered D1 in the spare FMPK 160 (S166). Accordingly, in the FMPK 160, the WRITE processing (see FIG. 14) is executed, and the D1 is stored in the flash chip 166.

Next, the MP 121 determines whether or not recovery has been done up to data in the last area of the failed FMPK 160 (S167). In the case where recovery has not been done up to the last area as a result (S167: No), the MP 121 changes the processing target to the next area (S168), and implements processing of S162 to S167 for the area of the processing target. On the other hand, in the case where recovery has been done up to the last area (S167: Yes), the MP 121 terminates the collection copy processing.

Although the compression processing has been described as an example of the addition processing executed by the storage device in this example, the addition processing may be encryption processing. Whether or not to execute processing of determining whether or not to execute the addition processing may be indicated from the management computer 20 as ON/OFF.

EXAMPLE 3

Next, a computer system according to Example 3 will be described. The computer system according to Example 3 is basically similar to the computer system according to Example 1 shown in FIG. 1. In the computer system according to Example 3, the storage controller 11 transfers determination information for determining whether or not it is a redundant code to a storage device (e.g., FMPK 160), and the storage device determines whether or not it is a redundant code based on the determination information transferred from the storage controller 11 and the type of command. A determination method for a redundant code may be either one of methods described in Example 1 and Example 2. In Example 3, there are two methods to creation methods for a redundant code. One is a method in which a redundant code is created based on data before compression in a similar manner to Example 1, and another one is a method in which a redundant code is created based on data after compression. When a redundant code is created with respect to data after compression, it is possible to recover data (or, accurately, compressed data to be stored in the flash chip 166) without compression/decompression not only for the redundant code but also for the data in recovery processing (hereinafter, rebuild) in the case where a fault has occurred in one of storage devices forming a RAID group. Thus, it is possible to increase the speed of rebuild processing.

Figure 17:
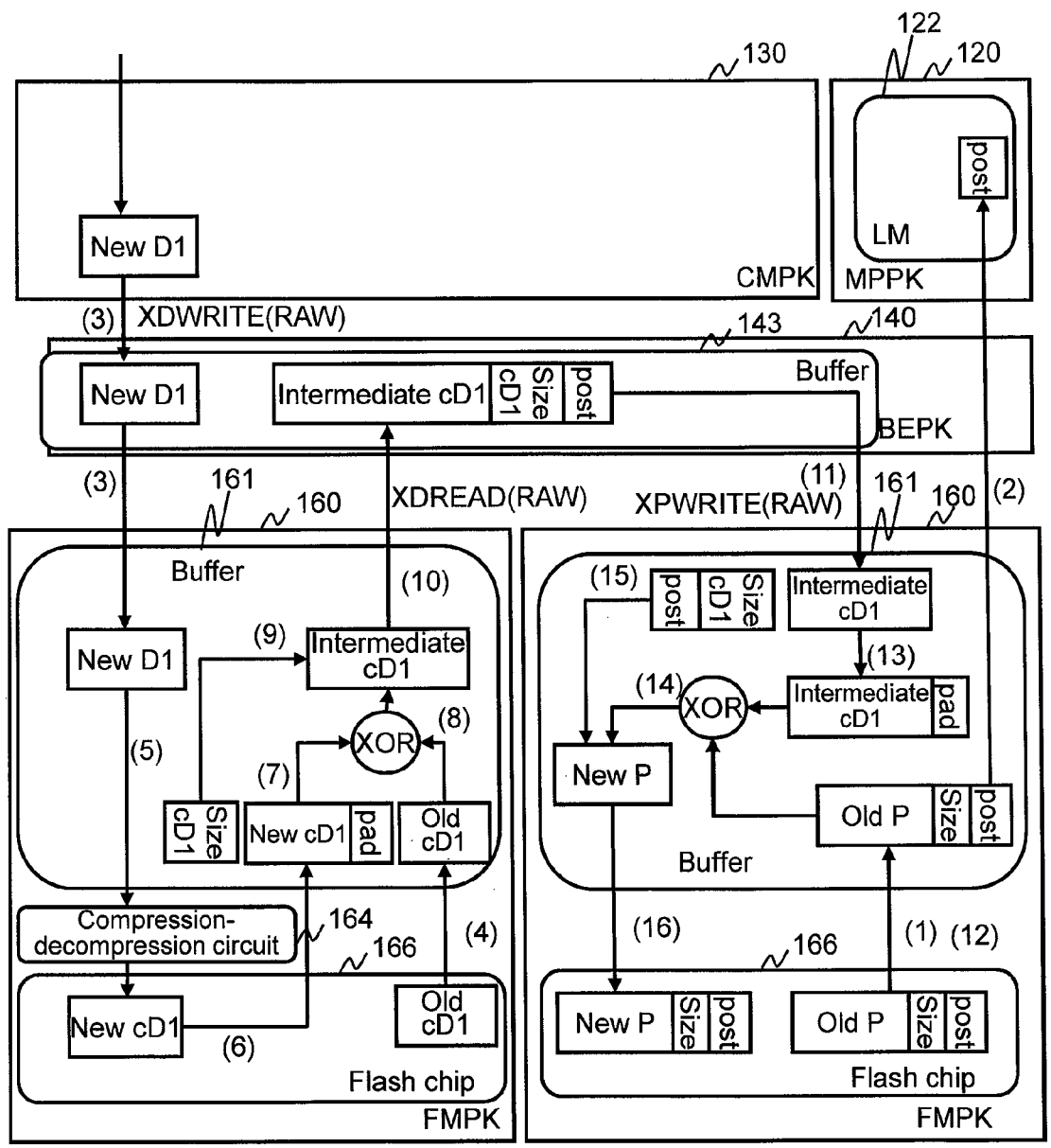
[FIG. 17]

FIG. 17 is a diagram showing an overview of RMW parity creation processing in the case of creating a parity using data after compression according to Example 3.

First, from the FMPK 160 storing a redundant code of a stripe column corresponding to WRITE data (hereinafter, new D1), the MP 121 acquires parity creation trigger information (creation trigger information) showing whether or not an old redundant code (old P) of the stripe column corresponding to the new D1 is created with respect to data after compression ((1) and (2) in FIG. 17). The MP 121 determines whether or not the redundant code is created with respect to data after compression based on the acquired information. In an example of FIG. 17, the old P is determined as a redundant code created with respect to data after compression. The MP 121 issues an XDWRITE command with respect to the FMPK 160 with the new D1 as a target ((3) in FIG. 17). At this time, the MP 121 provides the XDWRITE command with information indicating creation of a redundant code with respect to data after compression. (Hereinafter, a command provided with information indicating creation of a redundant code with respect to data after compression is mentioned with (RAW) provided after a command name.) The FMPK 160 that has received an XDWRITE(RAW) command stores the new D1 in the Buffer 161.

Next, the FMPK 160 stores compressed data (hereinafter, old cD1) of data before update (hereinafter old D1) of the new D1 in the Buffer 161 from the flash chip 166 ((4) in FIG. 17). Next, the FMPK 160 compresses the new D1 with the compression-decompression circuit 164 to create compressed data (new cD1), and stores the new cD1 in the flash chip 166 ((5) in FIG. 17). Next, the FMPK 160 stores the new cD1 in the Buffer 161 ((6) in FIG. 17). Next, the FMPK 160 inserts padding (pad in the figure) for adjusting the size of the new cD1 and the old cD1 ((7) in FIG. 17). As a method of creating data inserted with padding, creation may be through overwriting with the new cD1 in an area of a predetermined length in which a value for padding (e.g., 0 or the like) is stored in advance, creation may be through the FMPK 160 adding a value for padding with respect to the new cD1, or there may be a provision at the time of transfer by hardware such as the bus transfer apparatus 165. In examples below, processing of creating data inserted with padding may be any one of the methods.

Next, the FMPK 160 creates intermediate data (intermediate cD1) for creating a redundant code by implementing an XOR operation of the new cD1 and the old cD1 for which the data sizes have been matched by inserting padding ((8) in FIG. 17). Next, with the FMPK 160, the intermediate cD1 is provided with size information (SizecD1) of the new cD1 and is stored in the Buffer 161 ((9) in FIG. 17). The size information may be embedded in data or may be embedded in a command. The size information is held for each compression block unit. Instead of providing the size information, a terminal symbol may be embedded at the end of each compression block of the data (new cD1).

Next, the MP 121 issues an XDREAD(RAW) command with respect to the FMPK 160, and reads the intermediate cD1 into the Buffer 143 of the BEPK 140 ((10) in FIG. 17). Next, the MP 121 issues an XPWRITE (RAW) command with respect to the FMPK 160 storing a parity of a stripe column corresponding to the D1 ((11) in FIG. 17). The FMPK 160 that has received the XPWRITE(RAW) command stores the intermediate cD1, the SizecD1, and the parity creation trigger information transferred by the XPWRITE command in the Buffer 161.

Next, the FMPK 160 reads, into the Buffer 161, a redundant code (old P) corresponding to the old D1 and size information (Size) of each piece of data within a parity stripe provided to the redundant code ((12) in FIG. 17). Next, the FMPK 160 inserts padding into each compression block of the intermediate cD1 so that the size matches with the old P ((13) in FIG. 17). Next, the FMPK 160 creates a redundant code (hereinafter, new P) corresponding to the new D1 by an XOR operation of the intermediate cD1 and the old P of which the sizes match ((14) in FIG. 17). Next, with the FMPK 160, the size information corresponding to the D1 within the Size is updated and provided to the new P based on the SizecD1, and the new P is provided with information (post) showing that a parity has been created after compression as the parity creation trigger information and is stored in the flash chip 166 ((15) and (16) in FIG. 17). The Size or the parity creation trigger information provided to the redundant code may be embedded in data, may be held in the package memory 162 or the like as information corresponding to an address, or may be held in the LM 122 of the MPPK 120 as information corresponding to an address.

Figure 18:
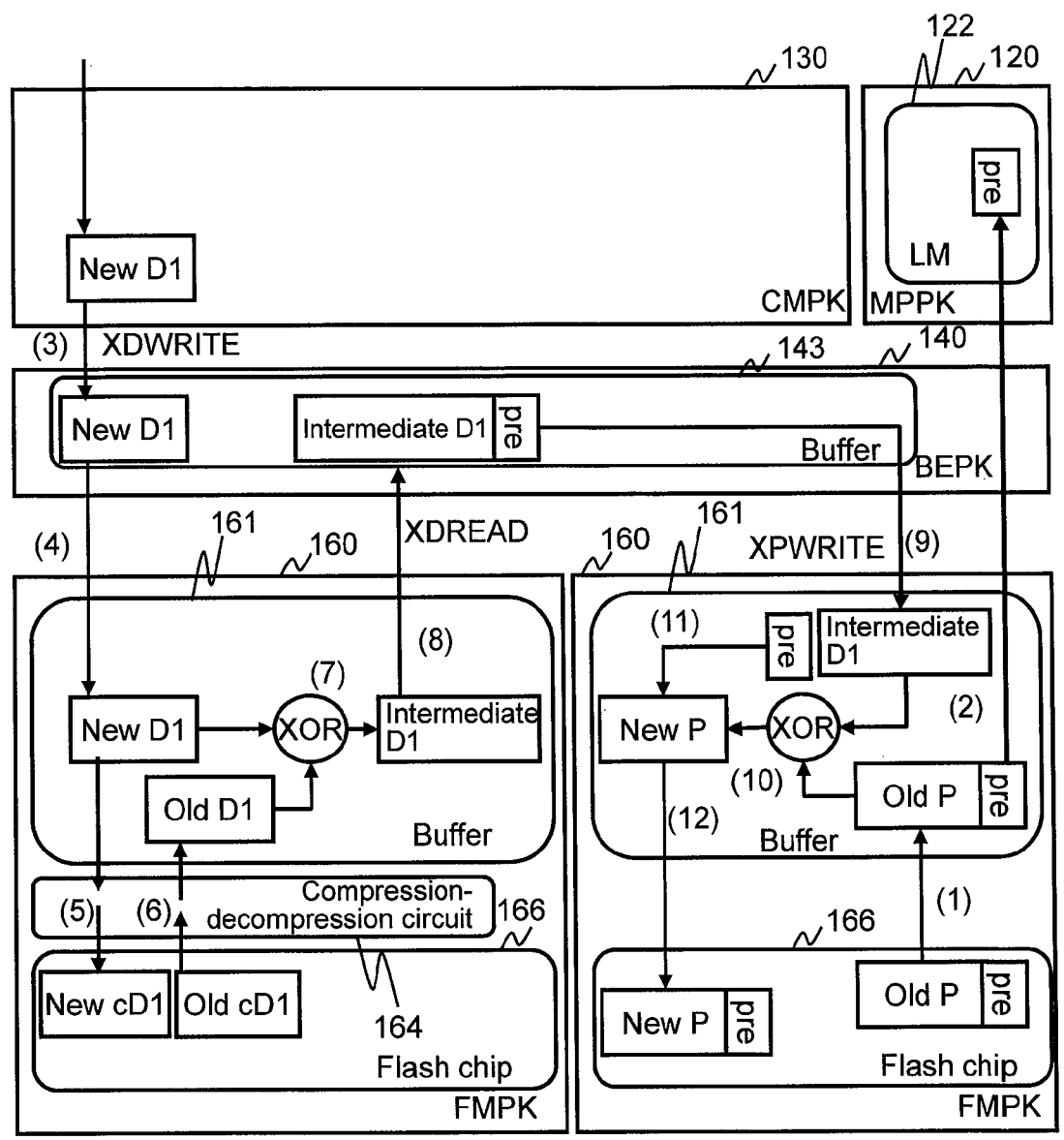
[FIG. 18]

FIG. 18 is a diagram showing an overview of the RMW parity creation processing in the case of creating a parity using data before compression according to Example 3. Since there is a portion in the RMW parity creation processing that is similar to the parity creation processing in Example 1 shown in FIG. 3, description for the similar portion is omitted, and only the difference will be described.

First, the MP 121 acquires the parity creation trigger information of a redundant code (old P) corresponding to the new D1 from the FMPK 160 in order to determine the creation trigger for a parity ((1) and (2) in FIG. 18). The MP 121 determines whether or not the redundant code is created with respect to data after compression based on the acquired information. In an example of FIG. 18, the old P is determined as a redundant code created with respect to data before compression. Next, the MP 121 issues an XDWRITE command and an XDREAD command with respect to the FMPK 160 in a similar manner to the example of FIG. 3, and acquires the intermediate D1 ((3) to (8) in FIG. 18). Next, the MP 121 provides the parity creation trigger information (before compression) to the intermediate D1, and issues an XPWRITE command with respect to the FMPK 160 ((9) in FIG. 18). The FMPK 160 that has received the XPWRITE command creates the new P in a similar manner to the example of FIG. 3 ((10) in FIG. 18). Next, with the FMPK 160, the parity creation trigger information (before compression) is provided to the new P and stored in the flash chip 166 ((11) and (12) in FIG. 18).

Figure 19:
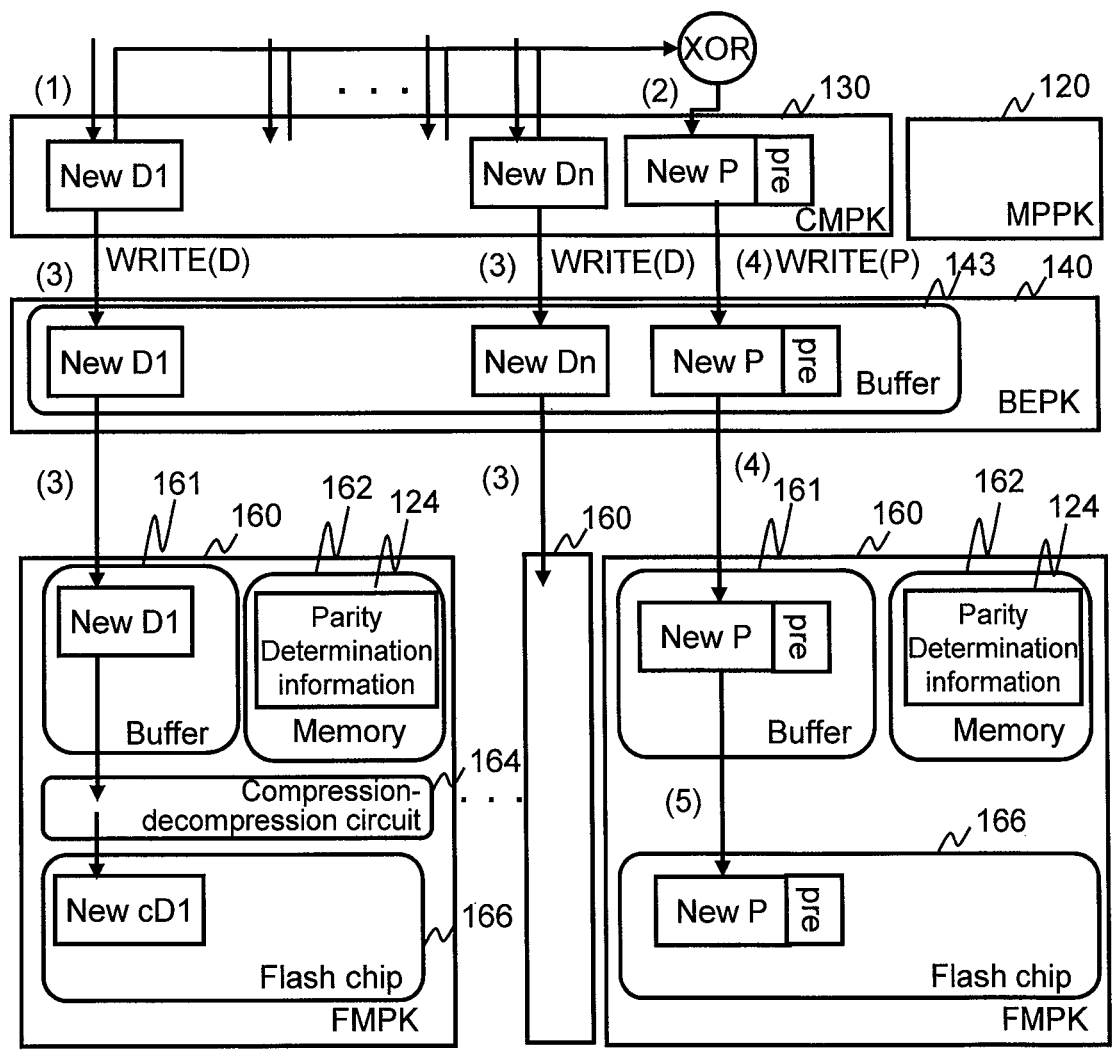
[FIG. 19]

FIG. 19 is a diagram showing an overview of all-stripe parity creation processing according to Example 3. Since there is a portion in the all-stripe parity creation processing according to Example 3 that is similar to the all-stripe parity creation processing shown in FIG. 11, description for the similar portion is omitted, and only the difference will be described.

First, the MP 121 creates the new P in a similar manner to FIG. 11 ((1) and (2) in FIG. 19). Next, by issuing a WRITE command (WRITE(D) in FIG. 19) to WRITE the new D1 to new Dn, to the FMPK 160, the MP 121 performs a WRITE with respect to the FMPK 160 ((3) in FIG. 19). Next, the FMPK 160 provides the parity creation trigger information (before compression: pre) with respect to the new P, and issues a WRITE command (WRITE(P) in FIG. 19) to WRITE this data to the FMPK 160 ((4) in FIG. 19). In the FMPK 160 that has received the WRITE command, WRITE processing is executed, and the new P provided with the parity creation trigger information is stored in the flash chip 166 ((5) in FIG. 19).

Figure 20:
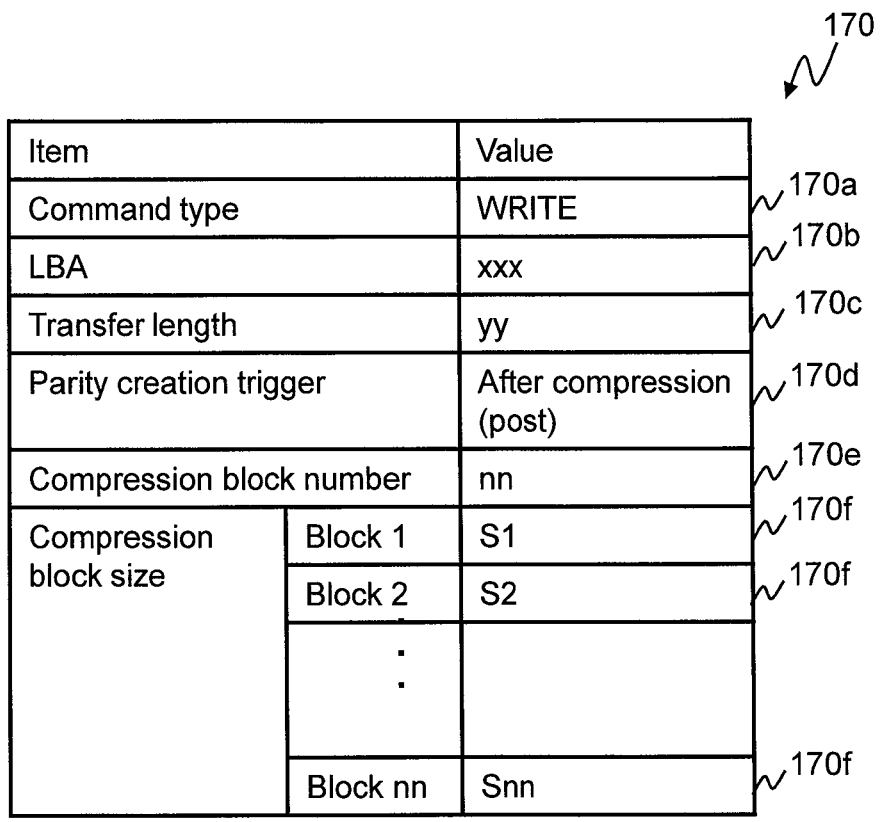
[FIG. 20]

FIG. 20 is a configuration diagram of one example of an XDREAD/XDWRITE/XPWRITE command according to Example 3.

A command 170 of the XDREAD/XDWRITE/XPWRITE command includes a command type 170a, an LBA 170b, a transfer length 170c, a parity creation trigger 170d, a compression block number 170e, and a compression block size 170f. The command type 170a shows the type of command. As the command type, XDREAD, XDWRITE, or WPWRITE is configured, for example. The LBA 170b is a logical block address of a logical VOL. The transfer length 170c is the length of data transferred by a command. The parity creation trigger 170d is parity creation trigger information showing whether to create a parity with respect to data after compression or to create a parity with respect to data before compression. The parity creation trigger 170d is configured as "after compression (post)" in the case of creating a parity with respect to data after compression, and is configured as "before compression (pre)" in the case of creating a parity with respect to data before compression. The compression block number 170e is a field that is valid only when the parity creation trigger 170d is "after compression," and is a value showing the number of compression blocks included within data to be transferred. The compression block size 170f is a field that is valid only when the parity creation trigger 170d is "after compression," and the command 170 has the compression block sizes 170f in a number corresponding to the compression blocks. Each compression block size 170f is a size of each compression block after compression. The parity creation trigger 170d, the compression block number 170e, and the compression block size 170f may be embedded in data instead a command.

Figure 21:
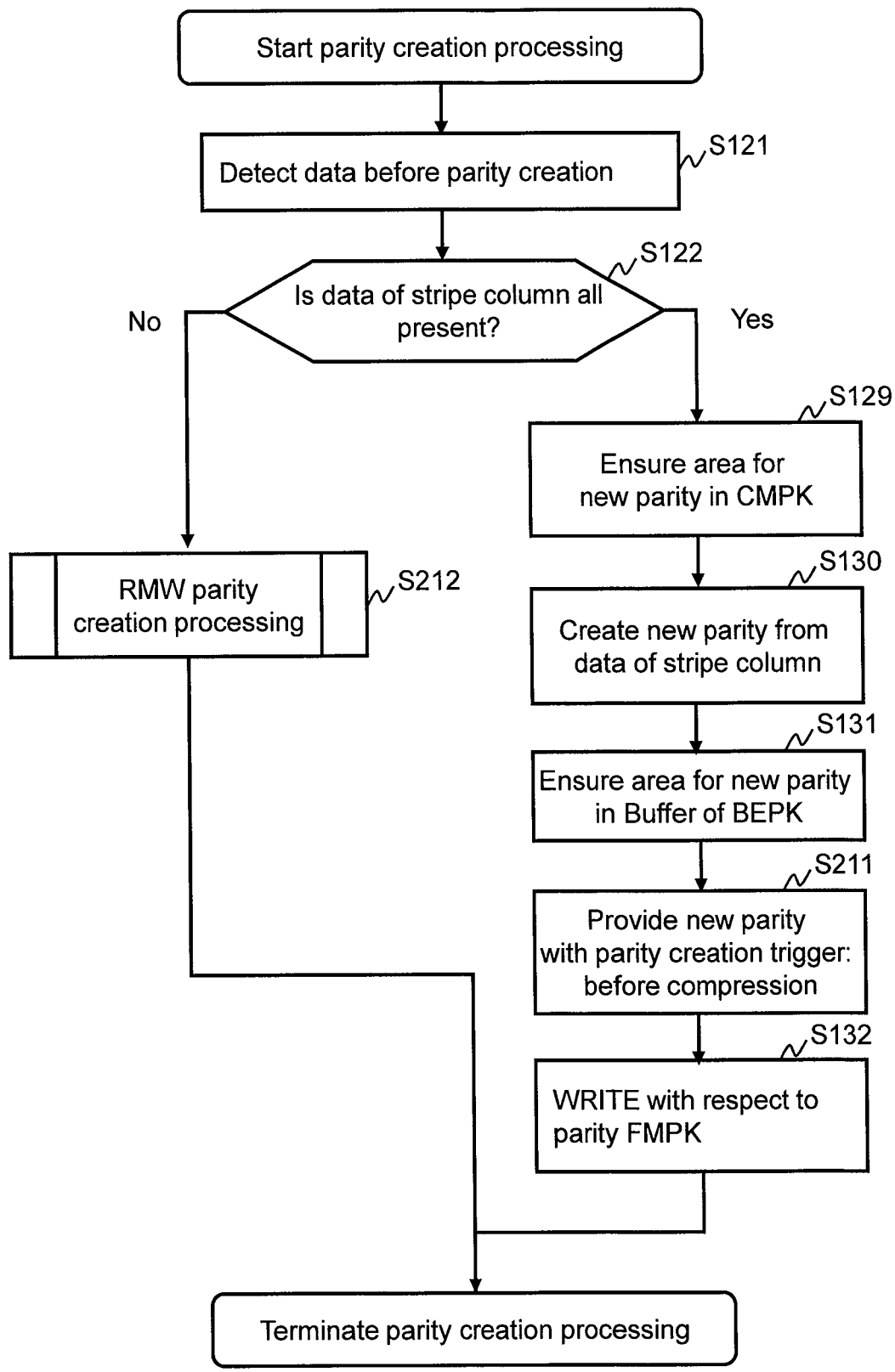
[FIG. 21]

FIG. 21 is a flowchart of parity creation processing according to Example 3. Portions similar to the parity creation processing according to Example 2 shown in FIG. 12 are denoted by the same reference signs, and redundant descriptions will be omitted.

The MP 121 determines whether or not all of data of a stripe column to which data as a target of parity creation belongs is present (S122). In the case where not all of the data of the stripe column is present as a result (S122: No), the RMW parity creation processing (see FIG. 22) is executed (S212), and processing is terminated. On the other hand, in the case where all of the data of the stripe column is present (S122: Yes), the MP 121 creates the new P in a similar manner to FIG. 12 (S129 to S131), and provides the parity creation trigger information (before compression) to the new P (S211). Next, the MP 121 issues a WRITE command with respect to the FMPK 160 (S132), and terminates processing.

Figure 22:
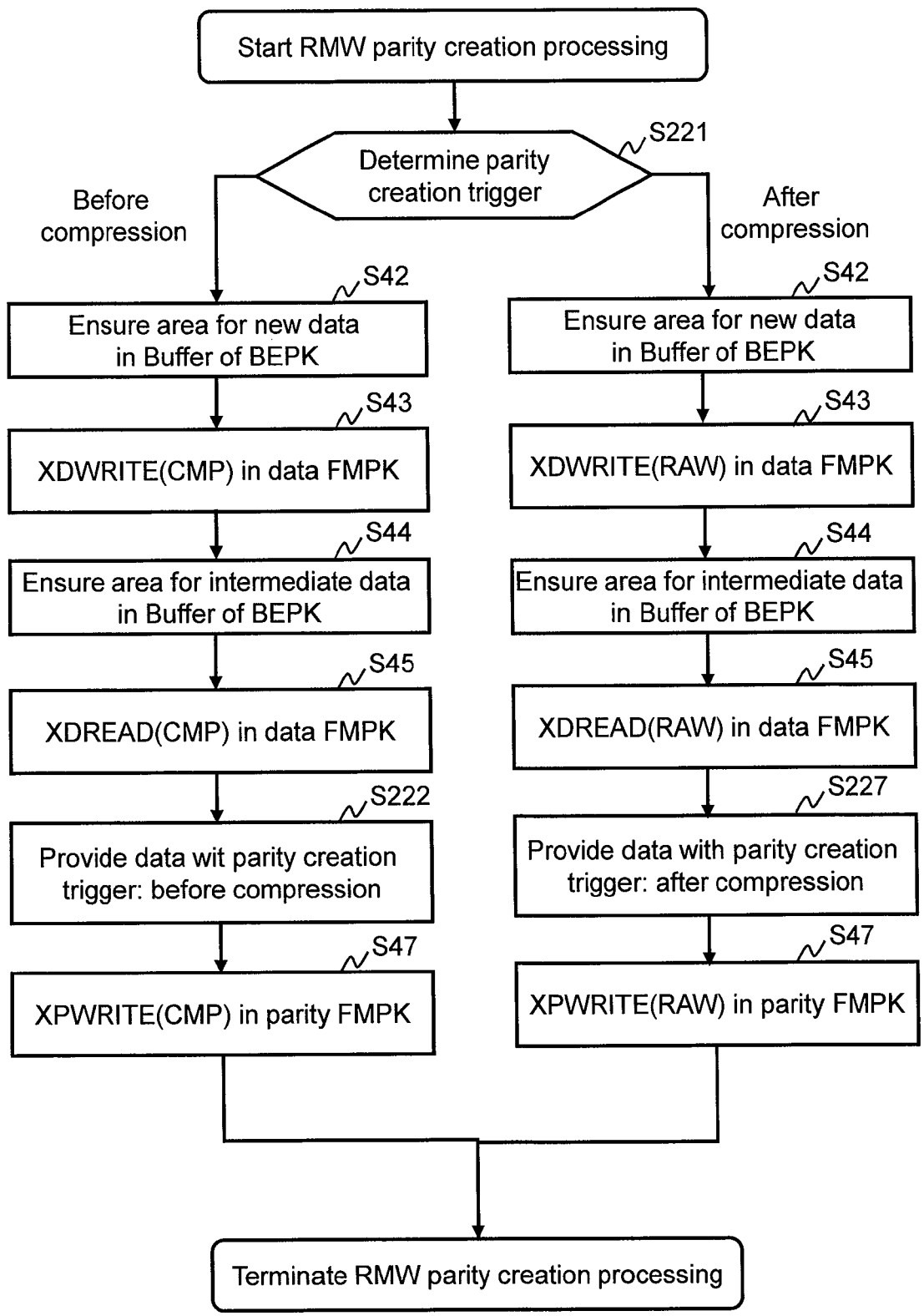
[FIG. 22]

FIG. 22 is a flowchart of the RMW parity creation processing according to Example 3. Portions similar to the parity creation processing shown in FIG. 4 are denoted by the same reference signs.

First, the MP 121 acquires the parity creation trigger information from the FMPK 160 storing a redundant code, and determines which one the parity creation trigger is (S221).

In the case where the parity creation trigger is after compression as a result (S221: after compression), the MP 121 issues an XDREAD command to the FMPK 160 (S43). At this time, the XDWRITE command is provided with the parity creation trigger information showing that the parity creation trigger is after compression. The MP 121 issues an XDREAD (RAW) command to READ intermediate data to the FMPK 160 (S45). Next, the MP 121 provides the parity creation trigger information (after compression) to the intermediate data that has been READ (S227). Next, the MP 121 issues an XPWRITE (RAW) command with respect to the FMPK 160 (S47).

On the other hand, in the case where the parity creation trigger is before compression (S221: before compression), the MP 121 issues an XDWRITE command to the FMPK 160. At this time, the command is provided with information that the parity creation trigger is before compression (S43). The MP 121 issues an XDREAD (CMP) command to READ intermediate data from the FMPK 160 (S45). Next, the MP 121 provides the parity creation trigger information (before compression) to the intermediate data that has been READ (S222). Next, the MP 121 issues an XPWRITE(CMP) command with respect to the FMPK 160 (S47).

Figure 23:
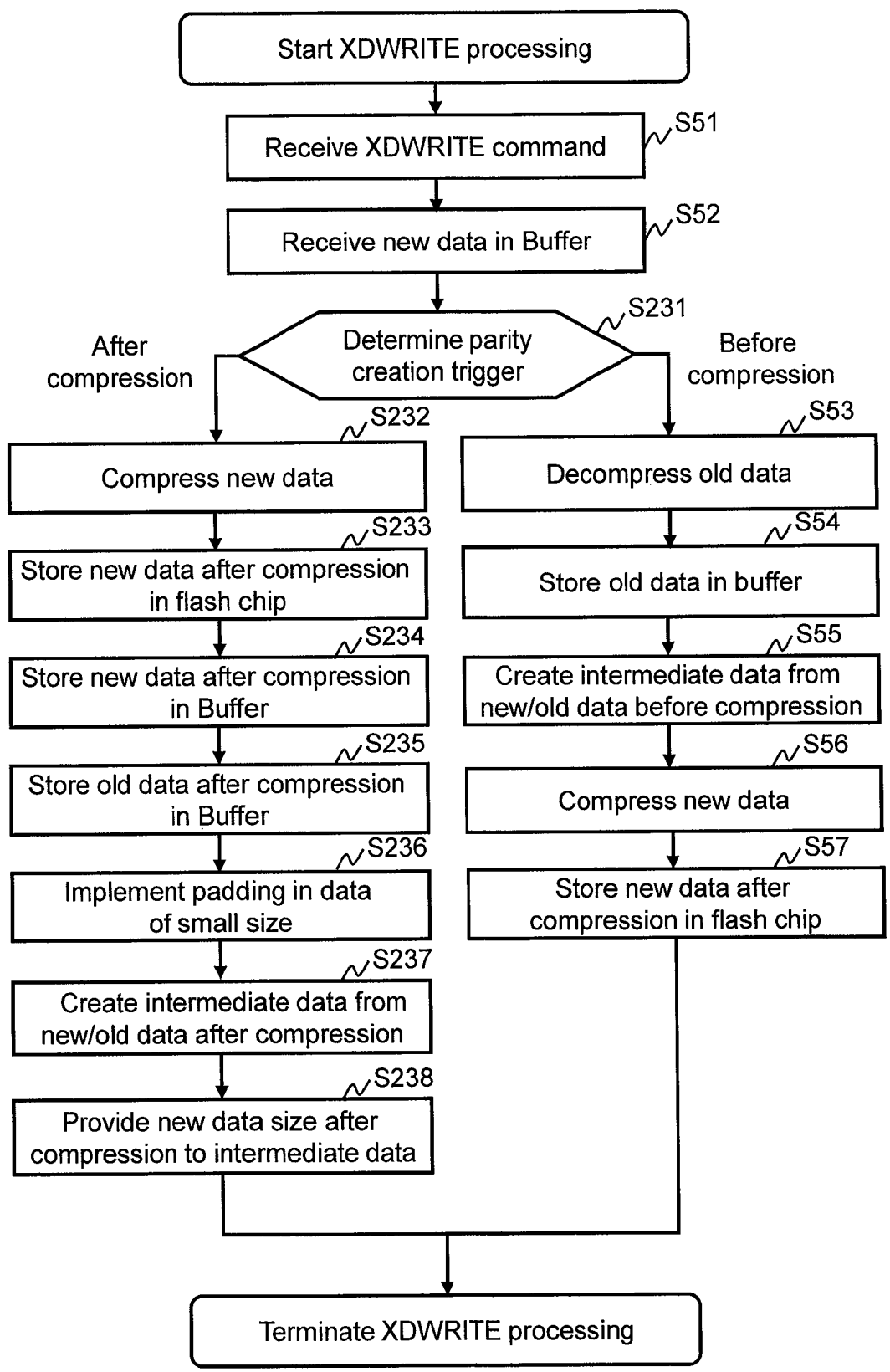
[FIG. 23]

FIG. 23 is a flowchart of the XDWRITE processing according to Example 3. Portions similar to the XDWRITE processing according to Example 1 shown in FIG. 5 are denoted by the same reference signs, and the difference from the processing will be mainly described.

The XDWRITE processing is processing that is executed in the case where the FMPK 160 has received an XDWRITE command. In the case where the XDWRITE command has been received, the FMPK 160 executes the processing, assuming that a target of the command is not a redundant code.

After receiving the XDWRITE command (after S51 and S52), the FMPK 160 determines which one the parity creation trigger with respect to data that is the target of the XDWRITE command is (S231).

In the case where the parity creation trigger is before compression as a result (S231: before compression), the FMPK 160 executes processing of steps S53 to S57, and terminates the XDWRITE processing.

On the other hand, in the case where the parity creation trigger is after compression (S231: after compression), the FMPK 160 acquires compressed data (hereinafter, new cD1) into which the new D1 is compressed with the compression-decompression circuit 164 (S232), and stores the new cD1 in the flash chip 166 (S233). Next, the FMPK 160 reads the new cD1 from the flash chip 166 into the Buffer 161 (S234). Next, the FMPK 160 stores old data after compression (old cD1) in the Buffer 161 (S235). Next, the FMPK 160 inserts padding in each compression block, such that the data sizes of the new cD1 and the old cD1 match (S236). Next, the FMPK 160 creates intermediate data (hereinafter, intermediate cD1) by an XOR operation of the new cD1 and the old cD1 of which the sizes have been caused to match (S237). Next, the FMPK 160 provides the size information after compression of each compression block within the new cD1 (S238) to the intermediate cD1, and terminates the XDWRITE processing.

Figure 24:
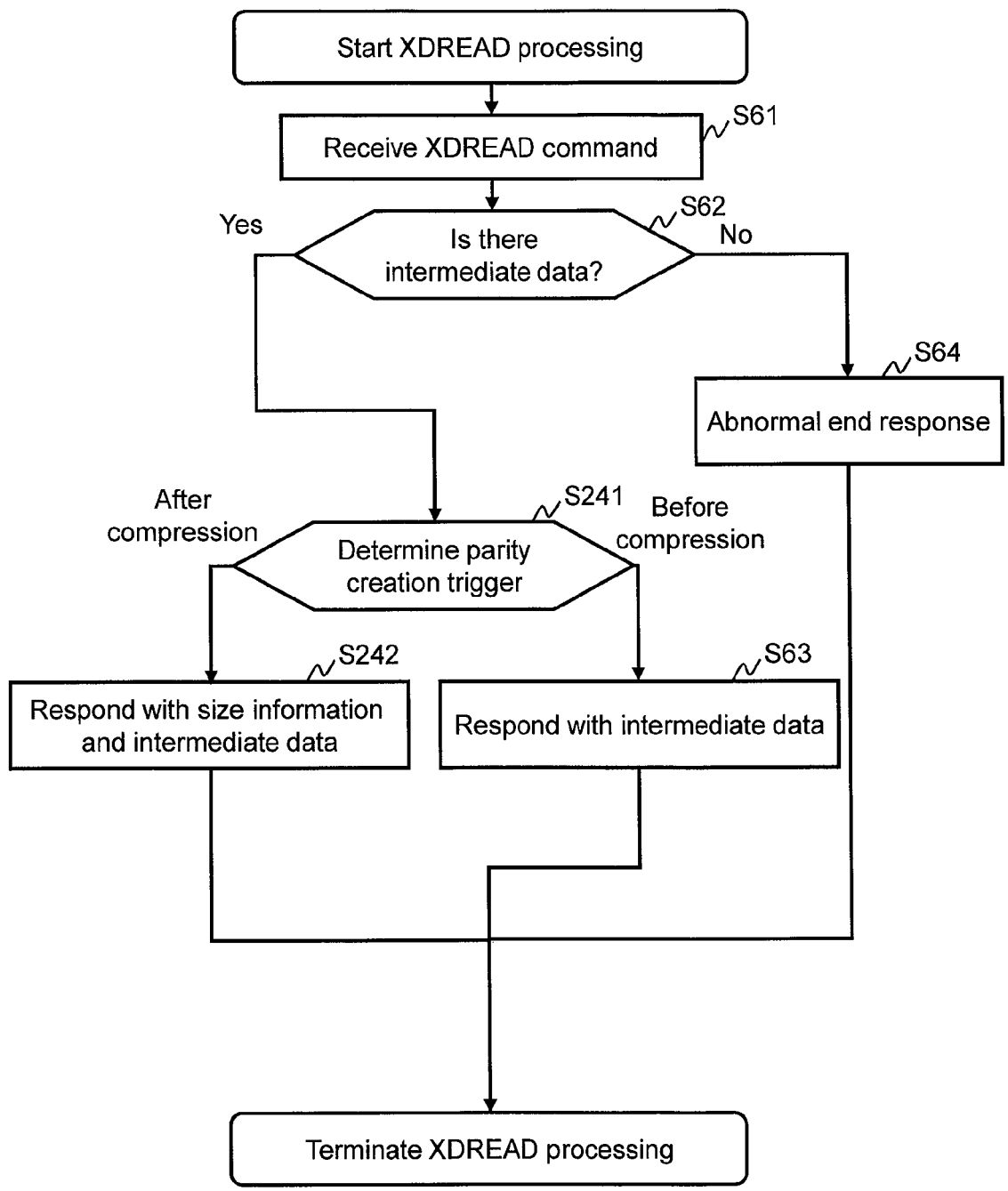
[FIG. 24]

FIG. 24 is a flowchart of XDREAD processing according to Example 3. Portions similar to the XDREAD processing according to Example 1 shown in FIG. 6 are denoted by the same reference signs, and the difference from the processing will be mainly described.

The XDREAD processing is processing that is executed in the case where the FMPK 160 has received an XDREAD command. In the case where the XDREAD command has been received, the FMPK 160 executes the processing, assuming that a target of the command is not a redundant code.

In the case where there is intermediate data that is an XDREAD target (S62: Yes), the FMPK 160 determines which one the parity creation trigger is (S241).

In the case where the parity creation trigger is before compression as a result (S241: before compression), the FMPK 160 executes processing of step S63, and terminates the XDREAD processing. On the other hand, in the case where the parity creation trigger is after compression (S241: after compression), the FMPK 160 transmits the intermediate data of the Buffer 161 and the size information provided to the intermediate data together to the MP 121 (S242).

Figure 25:
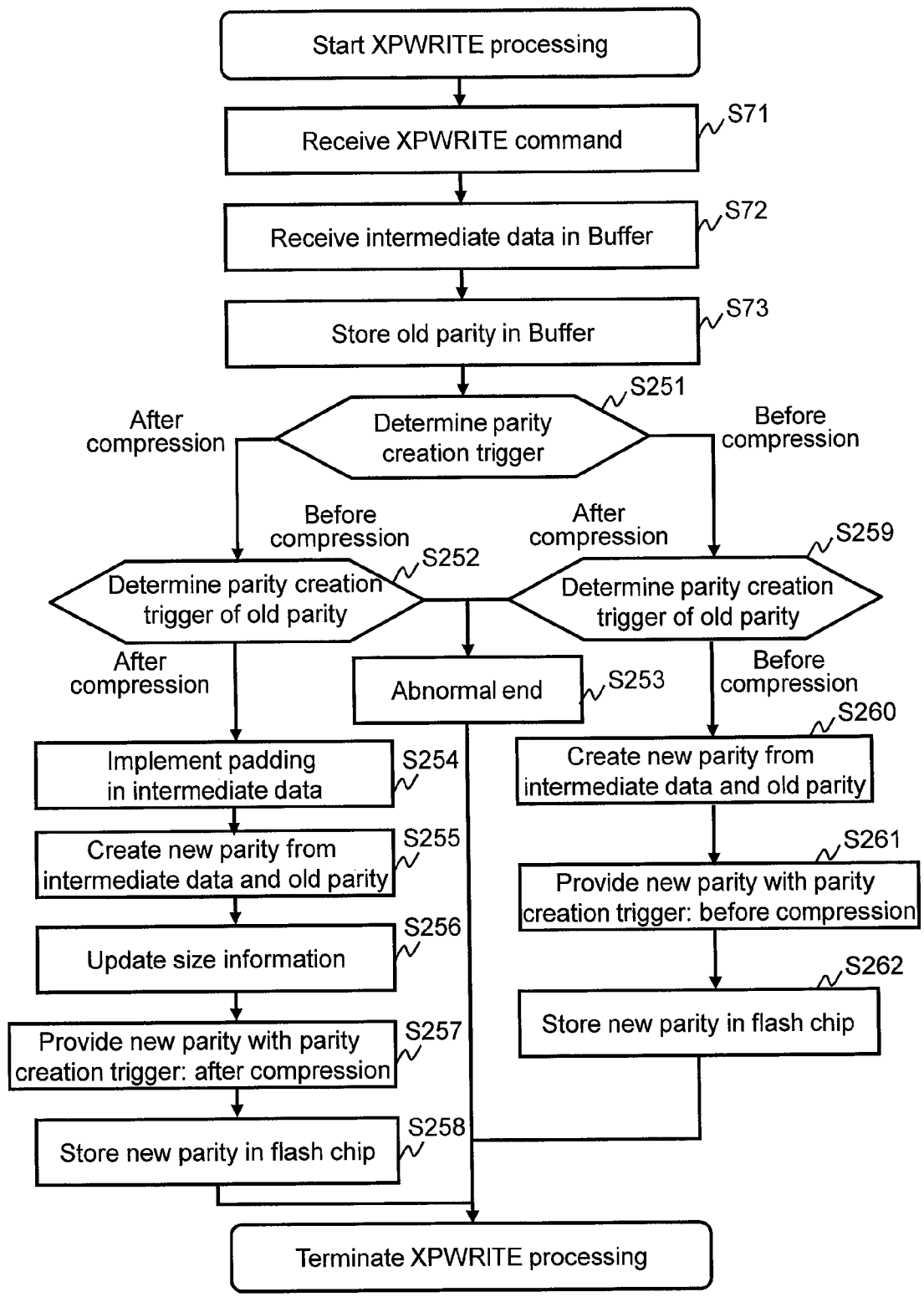
[FIG. 25]

FIG. 25 is a flowchart of XPWRITE processing according to Example 3. Portions similar to the XPWRITE processing according to Example 1 shown in FIG. 7 are denoted by the same reference signs, and the difference from the processing will be mainly described.

The XPWRITE processing is processing that is executed in the case where the FMPK 160 has received an XPWRITE command. In the case where the XPWRITE command has been received, the FMPK 160 executes the processing, assuming that a target of the command is a redundant code.

Following step S73, the FMPK 160 determines which one the parity creation trigger of the XPWRITE command is (S251).

In the case where it is determined that the parity creation trigger is before compression as a result (S251: before compression), the FMPK 160 determines which one the parity creation trigger of an old parity is (S259). In the case where it is determined that the parity creation trigger of the old parity is after compression as a result (S259: after compression), the parity creation trigger is not consistent. Therefore, the FMPK 160 responds with an abnormal end to the MP 121 (S253), and terminates the processing.

On the other hand, in the case where it is determined that that parity creation trigger of the old parity is before compression (S259: before compression), the FMPK 160 creates the new P by an XOR operation of the intermediate data and the old parity (S260), provides the parity creation trigger (before compression) to the new P (S261), stores the new P in the flash chip 166 (S262), and terminates the processing.

In the case where it is determined that the parity creation trigger is after compression in step S251 (S251: after compression), the FMPK 160 determines which one the parity creation trigger of the old parity is (S252). In the case where it is determined that the parity creation trigger of the old parity is before compression as a result (S252: before compression), the parity creation trigger is not consistent. Therefore, the FMPK 160 responds with an abnormal end to the MP 121 (S253), and terminates the processing.

On the other hand, in the case where it is determined that the parity creation trigger of the old parity is after compression (S252: after compression), the FMPK 160 implements padding for each compression block of the intermediate data based on the size information (S254). Next, the FMPK 160 creates the new P through an XOR operation of the intermediate data for which padding has been implemented and the old P (S255). Next, based on the size information provided to the intermediate data, the FMPK 160 updates the size information that has been provided to the old P and stored to the size information corresponding to the new P (S256). Next, with the FMPK 160, the new P is provided with the parity creation trigger (after compression) (S257) and stored in the flash chip 166 (S258), and the processing is terminated.

With this processing, creation based on data before compression and creation based on data after compression can be switched and executed for a parity of each piece of data, in accordance with the parity creation trigger. Therefore, by determining the parity creation trigger in accordance with the characteristic of each piece of data, a parity at an appropriate trigger can be created.

Figure 26:
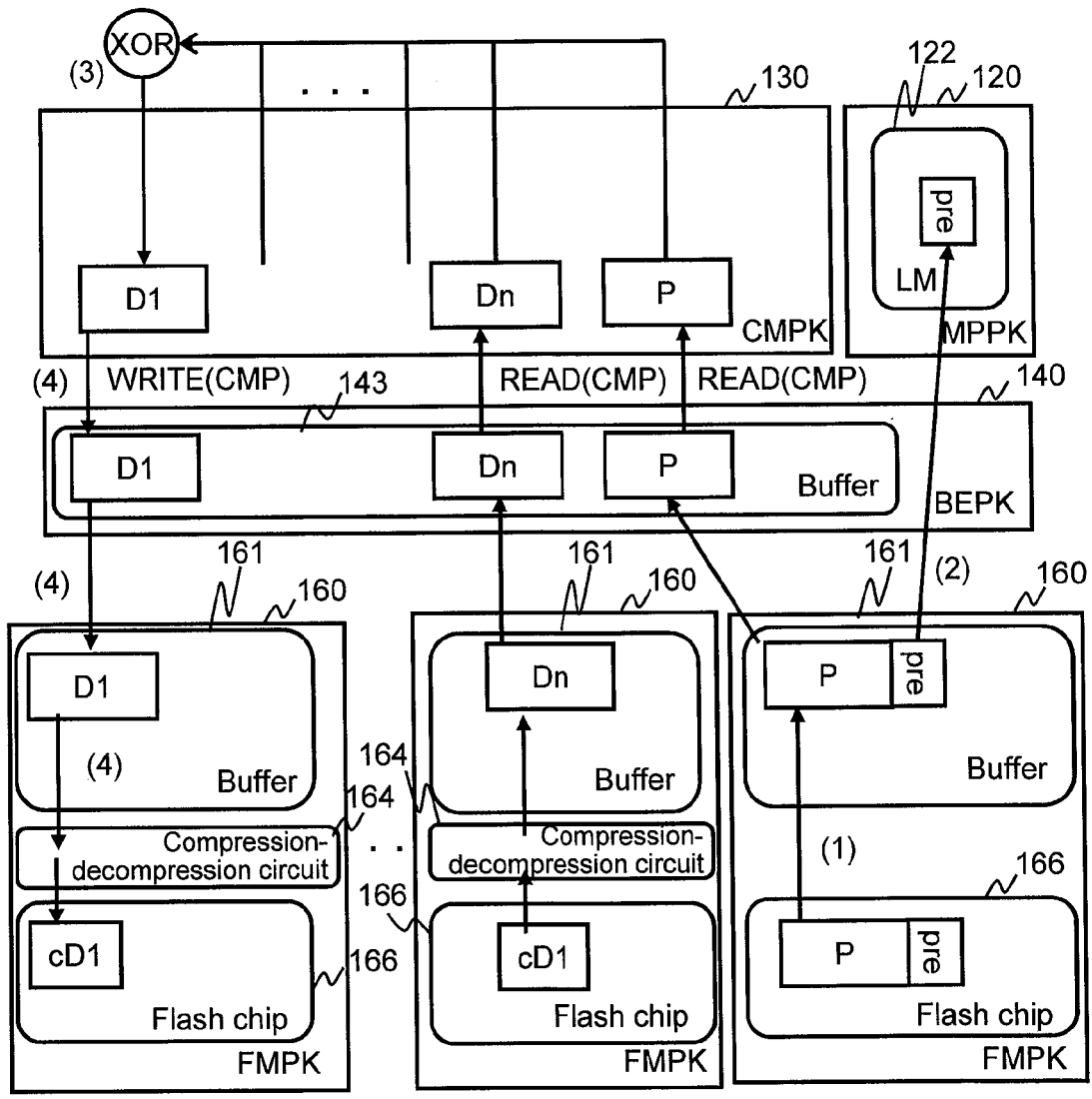
[FIG. 26]

FIG. 26 is a diagram showing an overview of collection copy processing for a stripe column having a parity that is created using data before compression according to Example 3. Since there is a portion in the collection copy processing that is similar to the collection copy processing in Example 2 shown in FIG. 15, description for the similar portion is omitted, and only the difference will be described.

The MP 121 acquires the parity creation trigger information of a redundant code of a stripe column that is a processing target from the FMPK 160 ((1) and (2) in FIG. 26), and determines that creation of a parity has been implemented before compression for the stripe column. Next, with the MP 121, the D1 is recovered in a similar manner to FIG. 15 ((3) in FIG. 26) and stored in the spare FMPK 160 ((4) in FIG. 26). At this time, a READ/WRITE command is provided with the parity creation trigger information (before compression). A command provided with the parity creation trigger information (before compression) is described with (CMP) provided after a command name.

Figure 27:
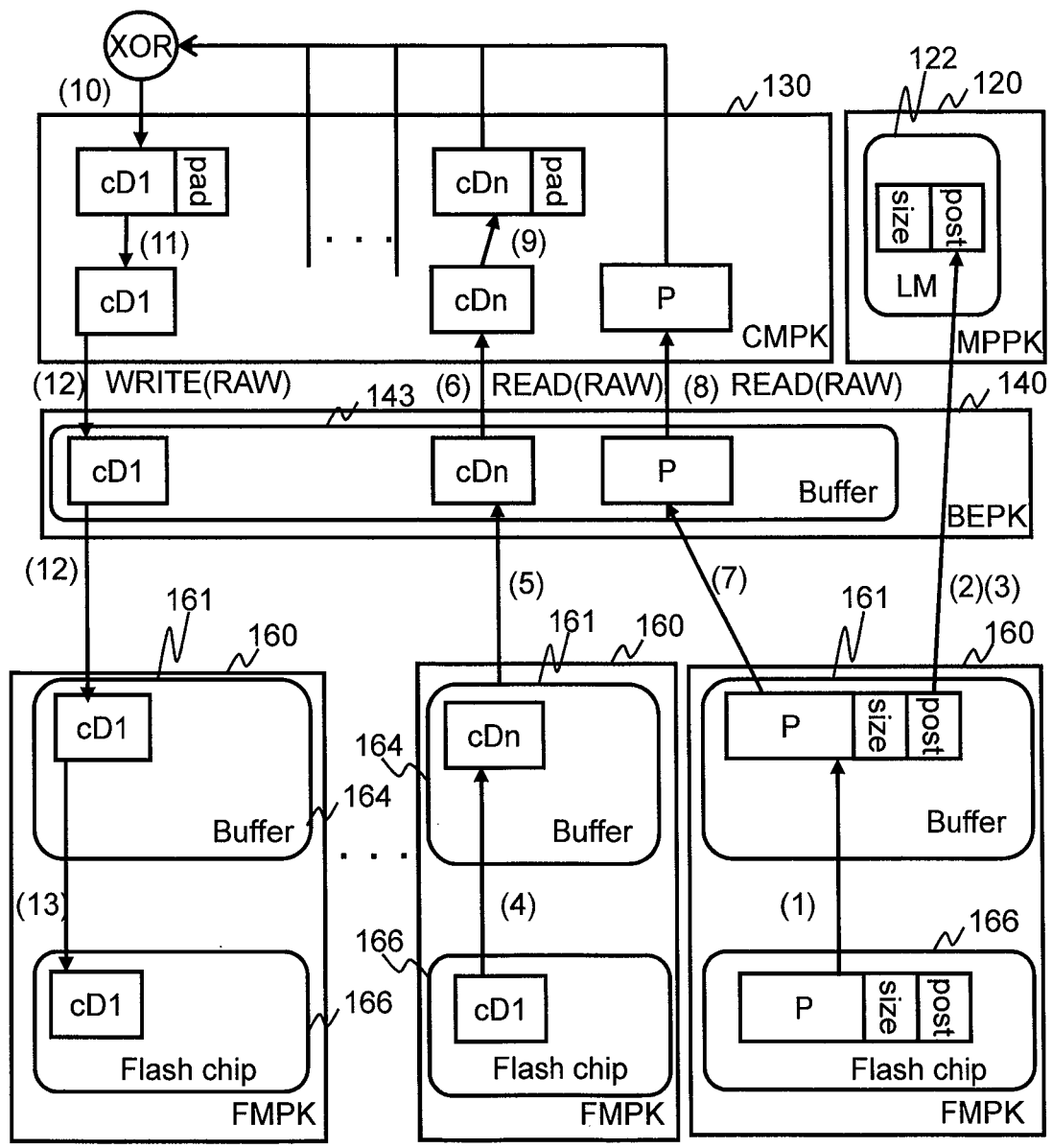
[FIG. 27]

FIG. 27 is a diagram showing an overview of the collection copy processing for a stripe column having a parity that is created using data after compression according to Example 3. Since there is a portion in the collection copy processing that is similar to the collection copy processing in FIG. 26, description for the similar portion is omitted, and only the difference will be described.

The MP 121 acquires the parity creation trigger from the FMPK 160, and determines that parity creation has been implemented after compression ((1) and (2) in FIG. 27). Next, the MP 121 acquires the size information after compression of data within a stripe from the FMPK 160 ((3) in FIG. 27). Next, the MP 121 issues a READ command to READ data (D2 to Dn) and a redundant code (P) from each FMPK 160, and acquires the same ((4) to (8) in FIG. 27). At this time, the MP 121 provides the compression necessity information (compression unnecessary) to the READ command. The FMPK 160 that has received a READ command (CMP) makes a response to the MP 121 without decompressing data after compression that is stored within the flash chip 166, based on the compression necessity information.

Next, the MP 121 inserts padding to each compression block of data after compression based on the size information, such that the data sizes match ((9) in FIG. 27). Next, the MP 121 creates data in which padding is inserted in recovery target data (cD1) after compression by an XOR operation of each piece of data inserted with padding and the P ((10) in FIG. 27). Next, based on the size information, the MP 121 eliminates padding to create the cD1 ((11) in FIG. 27). Next, the MP 121 issues a WRITE command to WRITE the cD1 with respect to the spare FMPK 160 ((12) in FIG. 27). At this time, the MP 121 provides the compression necessity information (compression unnecessary) to the WRITE command. The FMPK 160 that has received the WRITE command stores the cD1 in the flash chip 166 without compression, based on the compression necessity information ((13) in FIG. 27). It may be such that the FMPK 160 receives the size information from the MP 121, and the FMPK 160 executes processing of adding/deleting padding based on the size information. In the CMPK 130, data after compression and data before compression are managed separately, and data after compression cannot be seen from a host.

Figure 28:
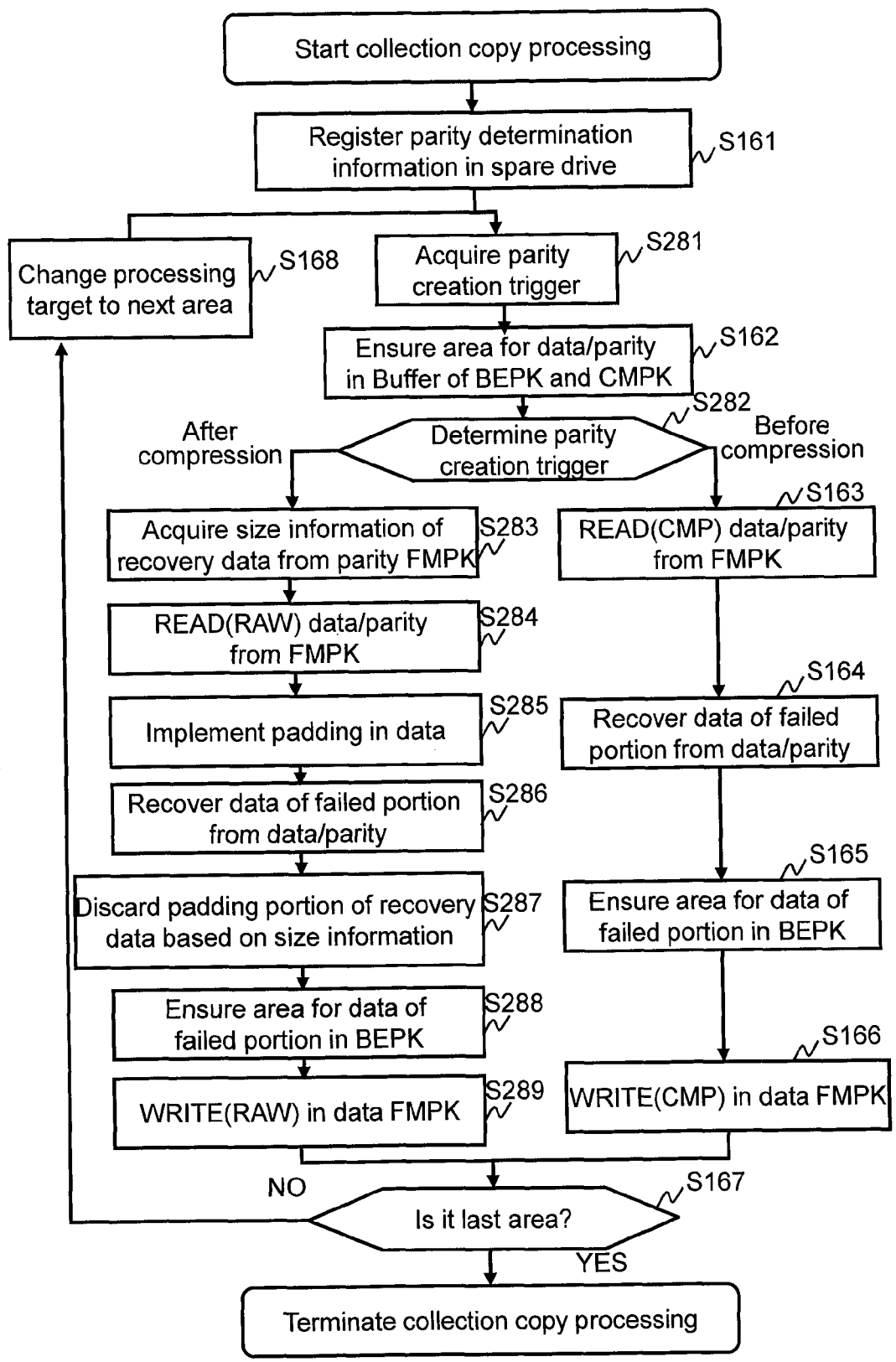
[FIG. 28]

FIG. 28 is a flowchart of the collection copy processing according to Example 3. Portions similar to the collection copy processing according to Example 2 shown in FIG. 16 are denoted by the same reference signs, and the difference from the processing will be mainly described.

The MP 121 acquires the parity creation trigger from the FMPK 160 storing a parity of a stripe column that is a recovery target (S281). Next, the MP 121 determines which one the parity creation trigger is (S282).

In the case where the parity creation trigger is before compression as a result (S282: before compression), the MP 121 executes processing of steps S163 to S166, and proceeds to step S167 of the processing.

On the other hand, in the case where the parity creation trigger is after compression (S282: after compression), the MP 121 acquires the size information after compression of data within a parity stripe from the FMPK 160 storing a parity (S283). Next, the MP 121 issues a READ command to READ data (cD2 to cDn) and a redundant code (hereinafter, P) within a stripe column necessary for recovery from the FMPK 160 (S284). At this time, the MP 121 provides the compression necessity information (compression unnecessary) to the READ command. Accordingly, for the target data and the redundant code, the FMPK 160 that has received the READ command directly reads, from the flash chip 166, and returns compressed data. Thus, in the FMPK 160, processing of decompressing data is not performed, and processing load can be reduced. Next, based on the size information, the MP 121 inserts padding in each compression block of the data, such that the sizes of the cD2 to cDn and the P match (S285).

Next, using the cD2 to cDn and the P, the MP 121 recovers data in which padding is inserted in recovery target data (hereinafter cD1) (S286). Next, based on the size information, the MP 121 deletes padding from the recovered data to create the cD1 that is the recovery target (S287). Next, the MP 121 ensures an area for and stores the cD1 in the BEPK 140 (S288), and issues a WRITE command to WRITE the cD1 with respect to the spare FMPK 160 (S289). At this time, the MP 121 provides the compression necessity information information (compression unnecessary) to the WRITE command. Accordingly, the FMPK 160 that has received the WRITE command stores the cD1 in the flash chip 166 without compression. Accordingly, the MP 121 does not perform compression processing, and processing load is reduced. Then, the MP 121 proceeds to step S167 of the processing.

In the case where the parity creation trigger with respect to recovery target data is after compression in the collection copy processing, the recovery target data (strictly speaking, compressed data of the recovery target data) can be recovered in the flash chip 166 without compression/decompression with the FMPK 160 not only for a parity but also for data, enabling a reduction in processing load on the FMPK 160 and an increase in the speed of rebuild processing.

Figure 29:
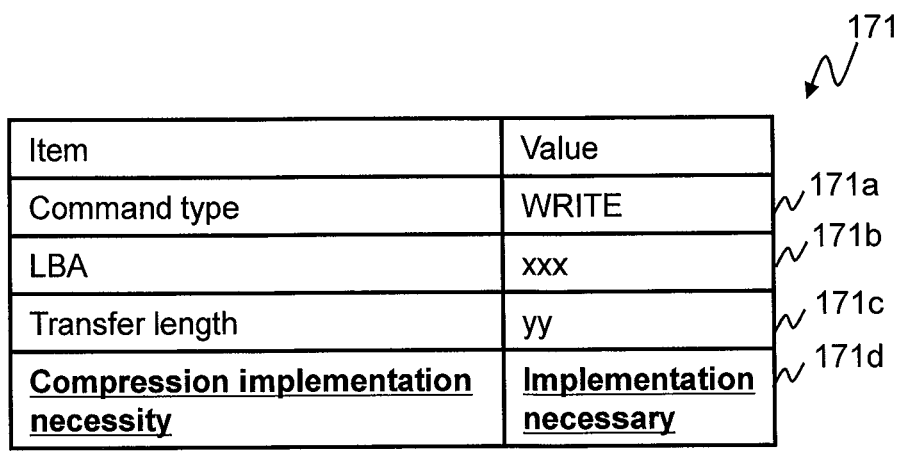
[FIG. 29]

FIG. 29 is a configuration diagram of one example of a READ/WRITE command according to Example 3.

A command 171 of the READ/WRITE command includes a command type 171a, an LBA 171b, a transfer length 171c, and a compression implementation necessity 171d. The command type 171a shows the type of command. As the command type, READ or WRITE is configured, for example. The LBA 171b is a logical block address of a logical VOL. The transfer length 171c is the length of data transferred by a command. The compression implementation necessity 171d is information showing whether or not to implement compression/decompression processing within the FMPK 160 with respect to READ/WRITE target data. In the case where the value of the compression implementation necessity 171d is implementation necessary, the FMPK 160 implements the compression/decompression processing inside thereof to implement READ/WRITE. However, in the case where the FMPK 160 has determined that the READ/WRITE target is a redundant code from the parity determination information

124, READ/WRITE processing is implemented without the compression/decompression processing being implemented within the FMPK 160 even if the value of the compression implementation necessity 171*d* is implementation necessary. In the case where the value of the compression implementation necessity 171*d* is implementation unnecessary, the FMPK 160 implements the compression/decompression processing inside thereof to implement READ/WRITE processing.

Figure 30:
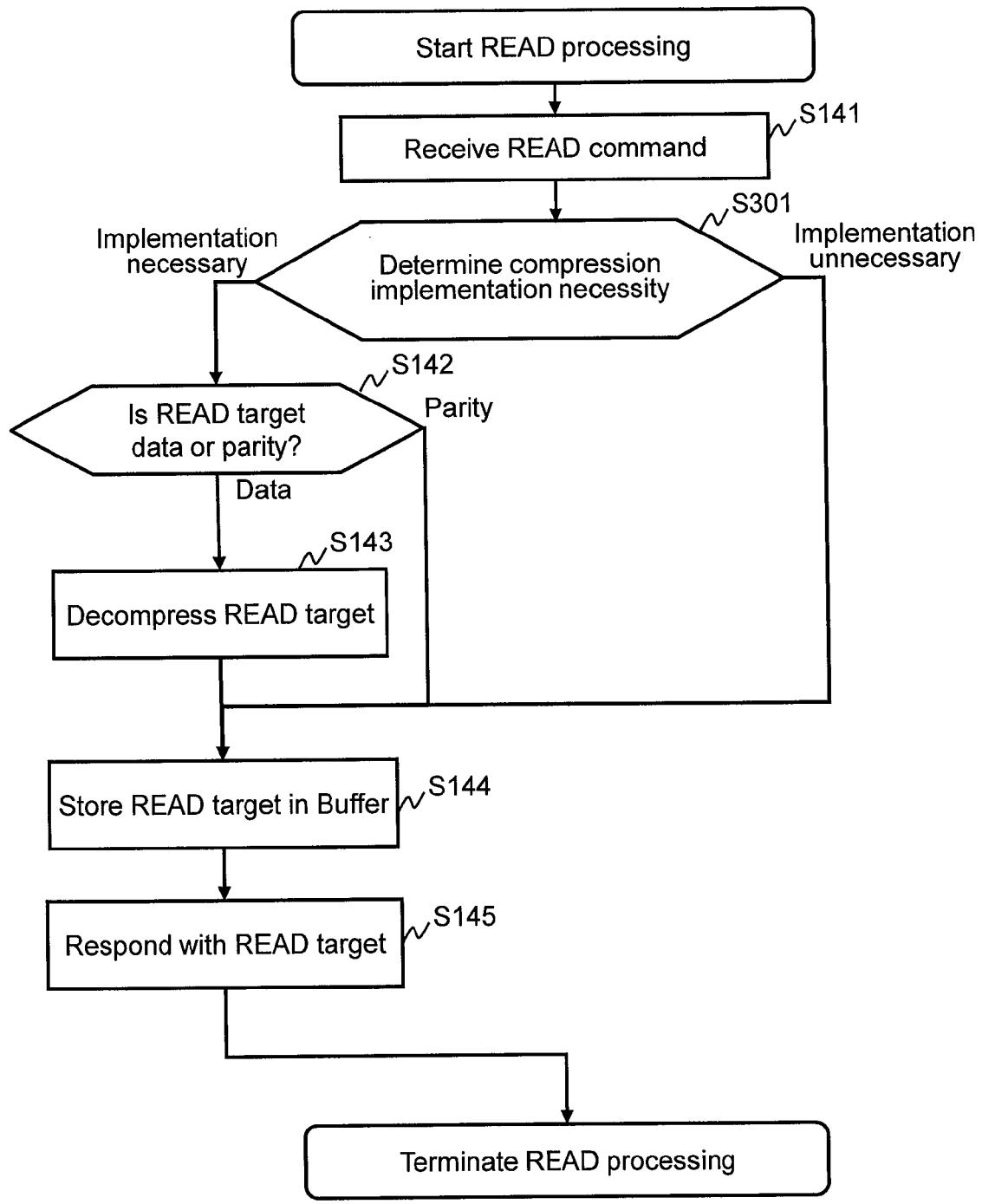
[FIG. 30]

FIG. 30 is a flowchart of the READ processing according to Example 3. Portions similar to the READ processing according to Example 2 shown in FIG. 13 are denoted by the same reference signs, and the difference from the processing will be mainly described.

Upon receiving a READ command (S141), the FMPK 160 determines which one the compression implementation necessity 171*d* is (S301).

In the case where the compression implementation necessity 171*d* is implementation necessary as a result (S301: implementation necessary), the FMPK 160 executes processing of steps S142 to S145 in a similar manner to FIG. 13.

On the other hand, in the case where the compression implementation necessity 171*d* is implementation unnecessary (S301: implementation unnecessary), the FMPK 160 stores, in the Buffer 161, data after compression that is a READ target stored in the flash chip 166 without decompression (S144). Next, the FMPK 160 transmits READ target data to the BEPK 140 (S145), and terminates the READ processing.

Figure 31:
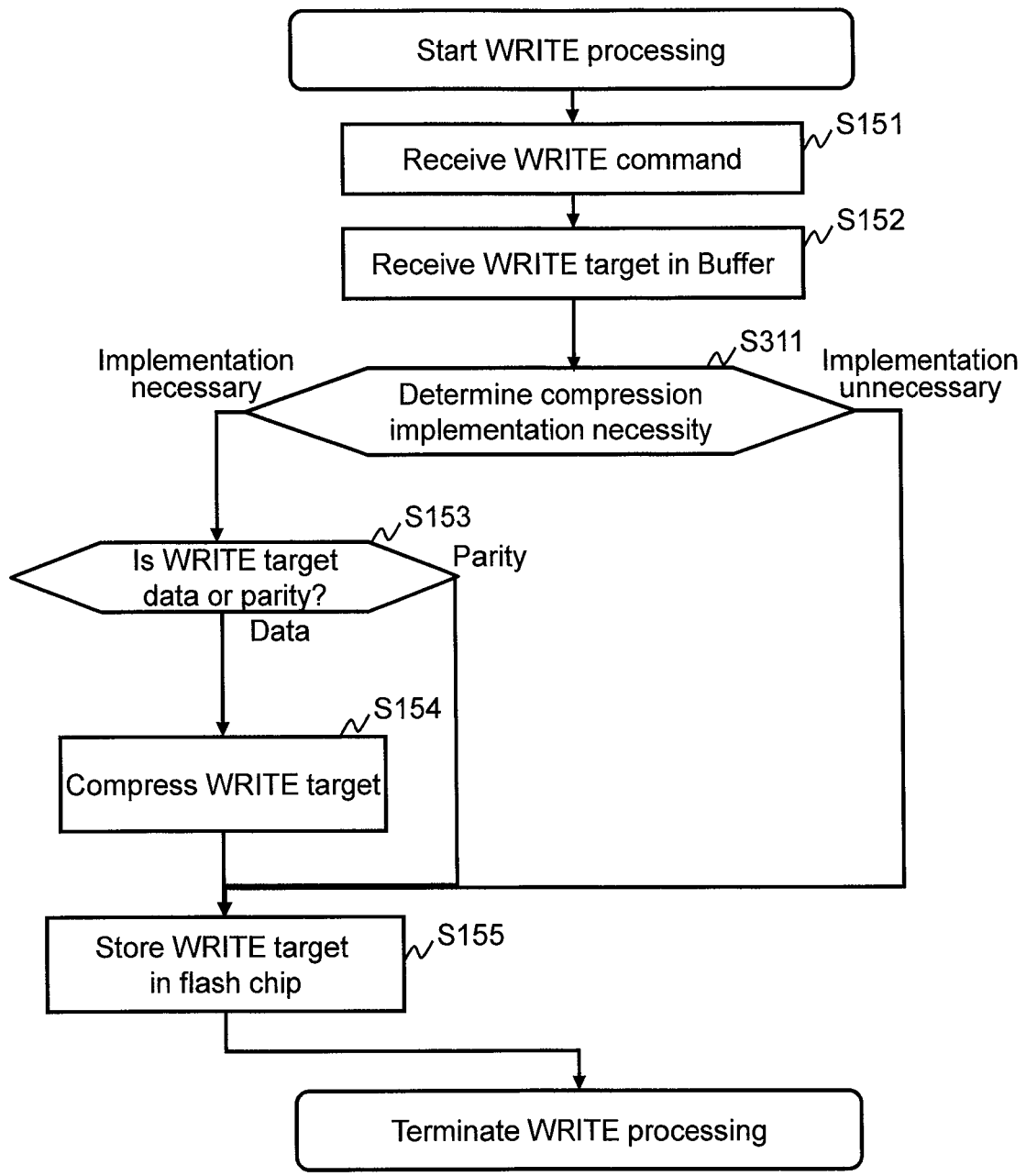
[FIG. 31]

FIG. 31 is a flowchart of WRITE processing according to Example 3. Portions similar to the WRITE processing according to Example 2 shown in FIG. 14 are denoted by the same reference signs, and the difference from the processing will be mainly described.

Upon receiving a WRITE command (S151), the FMPK 160 receives a WRITE target in the Buffer 161 (S152), and determines which one the compression implementation necessity 171*d* is (S311).

In the case where the compression implementation necessity 171*d* is implementation necessary as a result (S311: implementation necessary), the FMPK 160 executes processing of steps S153 to S155 in a similar manner to FIG. 14.

On the other hand, in the case where the compression implementation necessity 171*d* is implementation unnecessary (S311: implementation unnecessary), the FMPK 160 stores, in the flash chip 166, WRITE target data stored in the Buffer 161 without compression (S155).

Although the compression processing has been described as an example of the addition processing executed by the storage device in this example, the addition processing may be encryption processing. In the case where the addition processing is encryption processing, holding of the size information and processing (padding processing) in which data sizes are caused to match as described above are unnecessary, since the data size does not change after execution of processing with respect to data, unlike in the compression processing. Whether or not to execute processing of determining whether or not to execute the addition processing may be indicated from the management computer 20 as ON/OFF.

EXAMPLE 4

Next, a computer system according to Example 4 will be described. The computer system according to Example 4 is basically similar to the computer system according to Example 1 shown in FIG. 1. In the computer system according to Example 4, a storage device (e.g., FMPK 160) having a function for addition processing such as a function for compression processing or function for encryption processing controls implementation or non-implementation of the addition processing, based on information notified from a higher-level apparatus (e.g., the storage controller 11). Accordingly, the storage device can cause non-implementation of the addition processing with respect to, for example, only data stored in a predetermined area, and the IO processing performance of the storage device can be improved. The addition processing of the storage device may be not only the compression processing or the encryption processing, but also acquisition processing for a snapshot, for example.

The information notified from the higher-level apparatus may be information showing whether or not an IO target is a parity as in Examples 1 to 3, and may be information created based on the behavior or operation of an application program that is operated in a server, for example, to show that implementation of the addition processing with respect to data of a predetermined area is unnecessary. In short, information with which determination on implementation/non-implementation of the addition processing is possible suffices.

Figure 32:
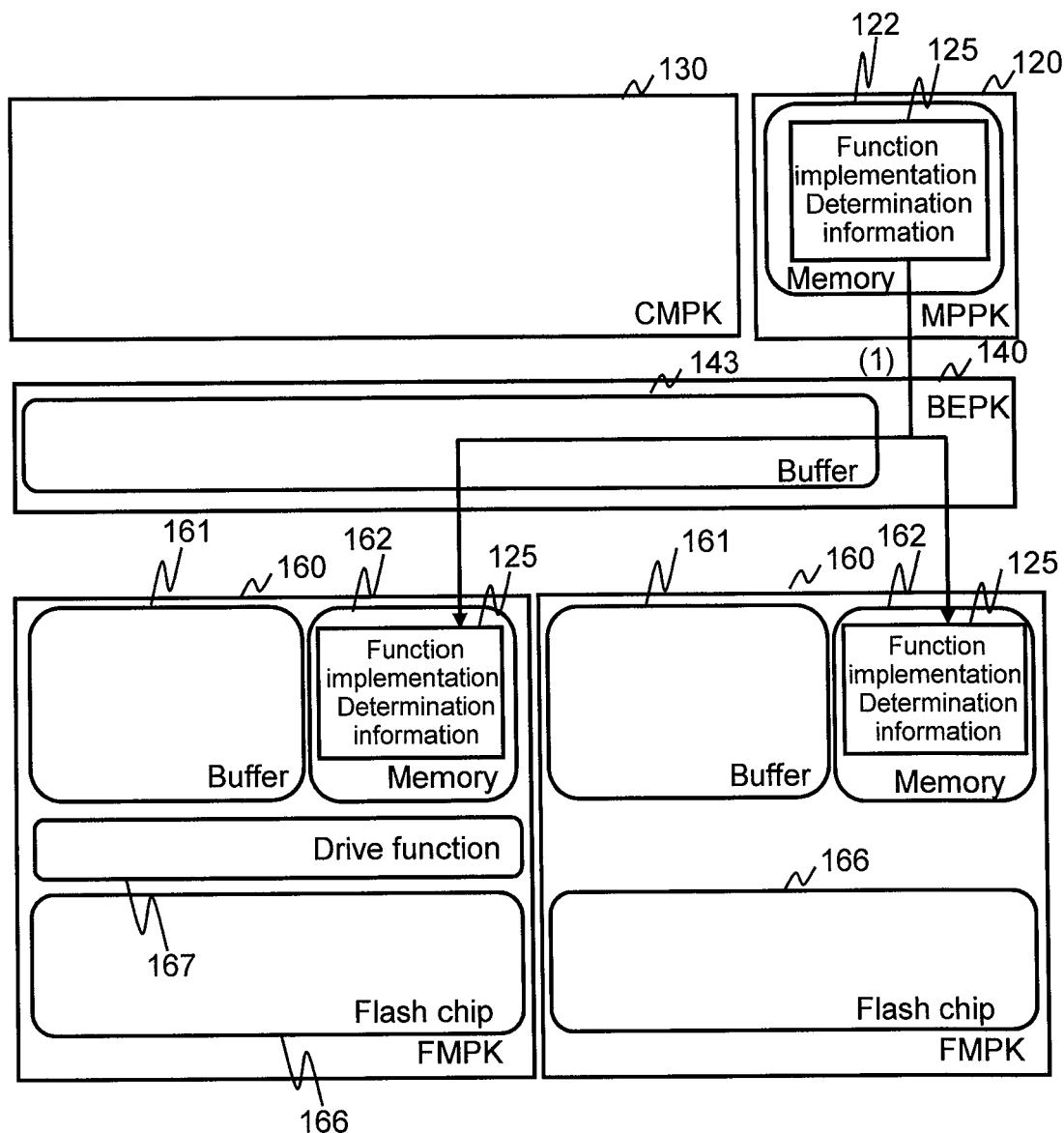
[FIG. 32]

FIG. 32 is a diagram showing an overview of function implementation determination information registration processing according to Example 4. Since there is a portion in the function implementation determination information registration processing that is similar to the parity determination information registration processing shown in FIG. 8, description for the similar portion is omitted, and only the difference will be described. The function implementation determination information registration processing shown in FIG. 32 is such that function implementation determination information 125 instead of the parity determination information 124 in the parity determination information registration processing shown in FIG. 8 is registered in the FMPK 166 ((1) in FIG. 32).

The function implementation determination information 125 is one example of determination information, and is information (function implementation necessity information) showing whether or not to implement the addition processing for each unit area of a fixed size of a logical VOL, for example. Based on the function implementation determination information 125, the FMPK 160 determines the function implementation necessity upon IO processing, and determines whether or not to implement the addition processing. For example, the function implementation determination information 125 may hold the function implementation necessity information for each unit area of an entire logical VOL, or may have the function implementation necessity information for each unit area within a specific size and a repetition number for the specific size. Instead of being registered in the FMPK 160 in advance, the function implementation determination information 125 may be embedded within a command or within data corresponding to a command for each IO and notified to the FMPK 160.

Figure 33:
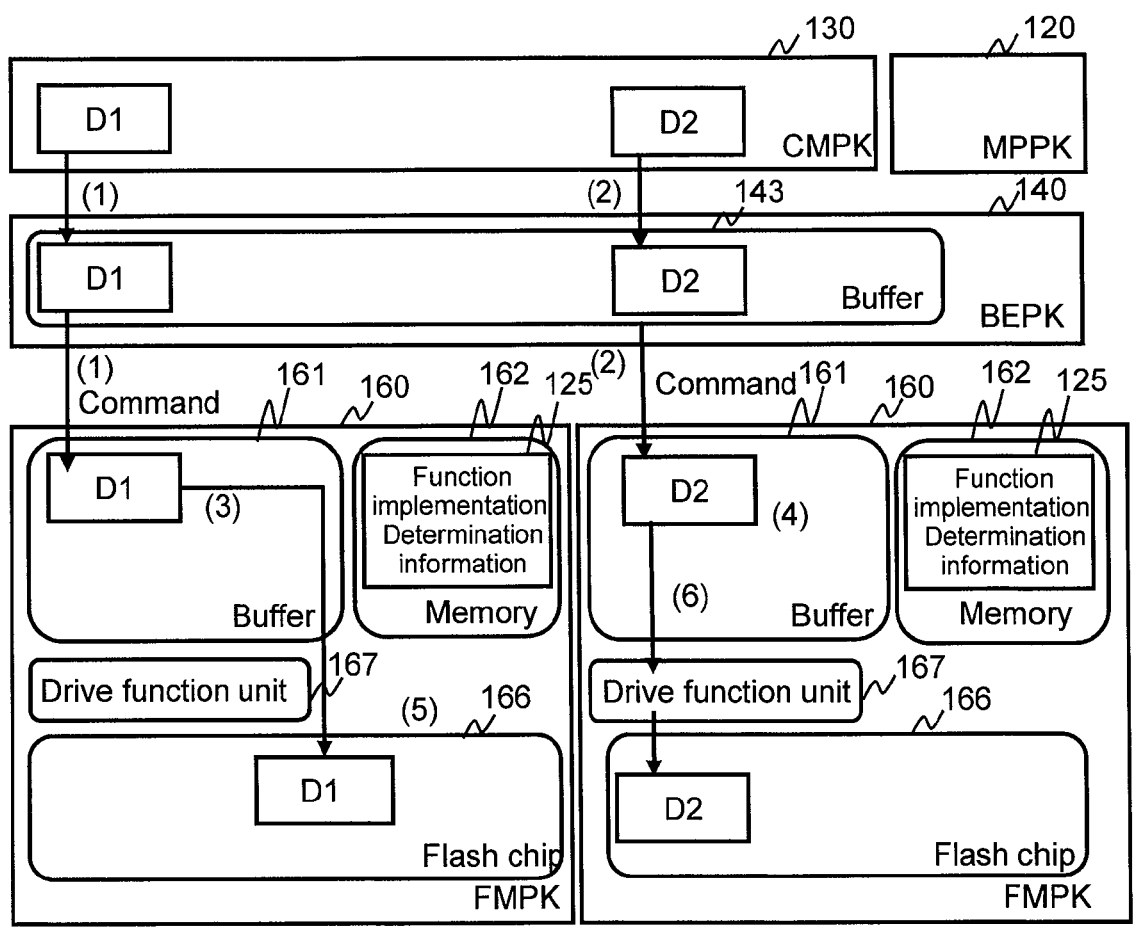
[FIG. 33]

FIG. 33 is a diagram showing an overview of command processing according to Example 4.

The MP 121 issues a command with respect to the FMPK 160 via the BEPK 140 ((1) and (2) in FIG. 33). In contrast, the FMPK 160 receives a command, and, based on address information within the command and the function implementation determination information 125, performs determination on the implementation necessity of predetermined addition processing by a drive function unit 167 for input-output target data (D1 or D2 in FIG. 33) of the command ((3) and (4) in FIG. 3). The drive function unit 167 may be a dedicated circuit that implements the predetermined addition processing, or may be formed by the package processor 163 of the FMPK 160.

In the case where it is determined that implementation of the addition processing is unnecessary (a case with D1 in FIG. 3), the FMPK 160 stores the D1 in the flash chip 166 without executing the addition processing by the drive function unit 167 ((5) in FIG. 3).

On the other hand, in the case where it is determined that implementation of the addition processing is necessary (a case with D2 in FIG. 33), the FMPK 160 executes the predetermined addition processing relating to the D2 by the drive function unit 167, and then stores data after execution of the addition processing in the flash chip 166 ((6) in FIG. 33).

An overview of processing when writing data in the flash chip 166 has been described with FIG. 33. When reading data from the flash chip 166, it suffices to perform processing corresponding to the processing upon writing. Specifically, it suffices for the FMPK 160 to directly read data from the flash chip 166 without executing the addition processing in the case where it is determined that implementation of the addition processing is unnecessary (a case of reading the D1), or execute the addition processing by the drive function unit 167 with respect to and read data of the flash chip 166 in the case where it is determined that implementation of the addition processing is necessary (a case of reading the D2).

Figure 34:
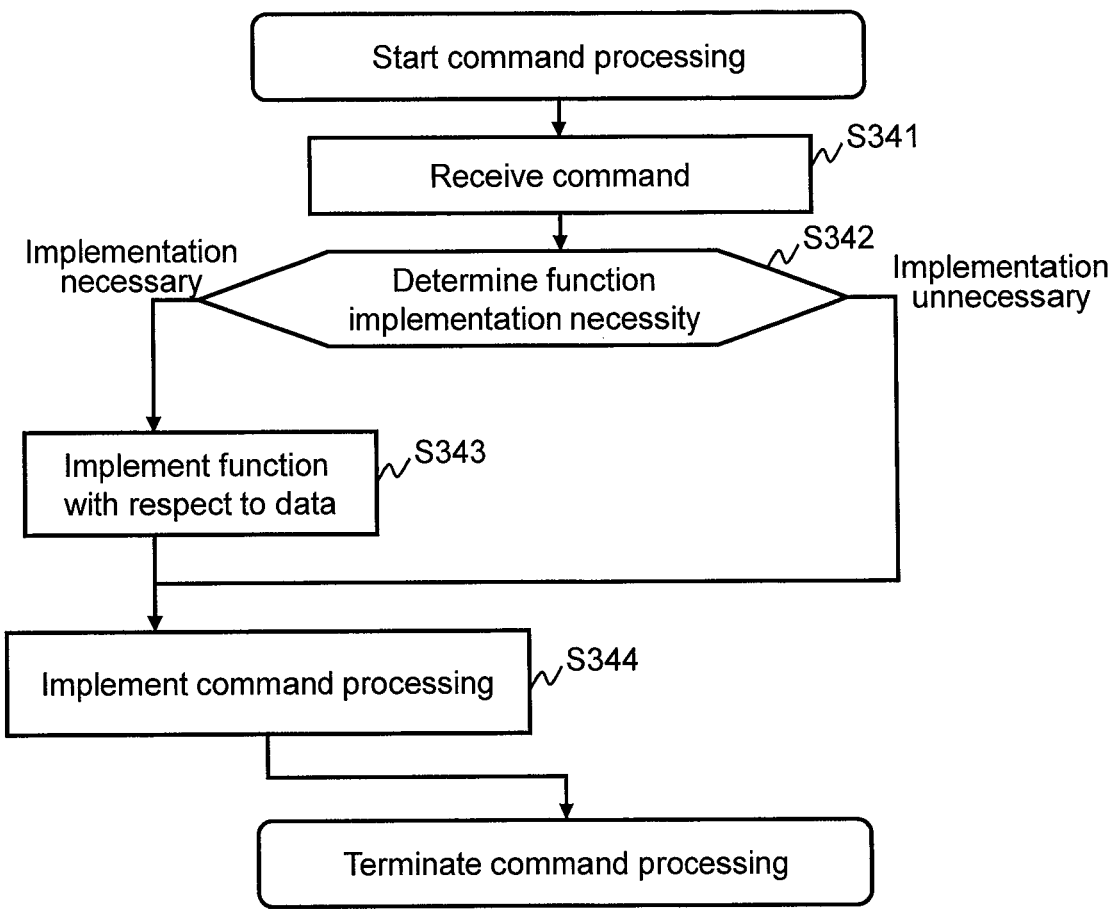
[FIG. 34]

FIG. 34 is a flowchart of the command processing according to Example 4.

The command processing is processing executed by the FMPK 160 that has received a command issued from the storage controller 11.

Based on the address information that is a target of the command and the function implementation determination information 125, the FMPK 160 determines, upon receiving the command (S341), whether or not to implement the predetermined addition processing (function implementation necessity) with respect to data of an address shown by the address information (S342).

In the case where it is determined that implementation of the predetermined addition processing is necessary as a result (S342: implementation necessary), the FMPK 160 implements the predetermined addition processing (S343) by the drive function unit 167 with respect to data that is the target of the command, implements processing (e.g., IO processing of data) corresponding to the command (S344), and terminates the command processing.

On the other hand, in the case where it is determined that implementation of the predetermined addition processing is not necessary (S342: implementation unnecessary), the FMPK 160 implements processing (e.g., IO processing of data) corresponding to the command without performing the addition processing by the drive function unit 167 (S344).

With this processing, the FMPK 160 executes only the processing corresponding to the command without executing the addition processing with respect to data for which execution of the addition processing is not necessary. Therefore, processing load on the FMPK 160 can be reduced.

Several examples of the present invention have been described above. However, the present invention is not limited to these examples, and it is needless to say that various modifications are possible without departing from the gist thereof.

REFERENCE SIGNS LIST

30 Host computer
10 Storage system
11 Storage controller
160 FMPK
166 Flash chip

The invention claimed is:

1. A storage system comprising:
a storage device including a recording medium that stores data and a device controller that executes addition processing involving a change of state of the data with respect to the data; and
a storage controller that controls input and output of data for the storage device,
the storage controller being configured to transmit, to the storage device, determination information that can be utilized by the device controller for determining whether or not to execute the addition processing along with input-output processing relating to input-output target data, and
the device controller being configured to control execution of the addition processing with respect to the input-output target data based on the determination information, wherein the device controller is configured to store user data utilized by a host computer, and a redundant code that is used for recovering the user data and calculated based on the user data,
wherein the determination information includes information with which whether input-output target data is the user data or the redundant code is identifiable,
wherein the device controller is configured to execute, in a case where input-output target data is identified as the user data based on the determination information, input-output processing that involves the addition processing with respect to the input-output target data, and execute, in a case where the input-output target data is identified as the redundant code, input-output processing that does not involve the addition processing;
wherein the addition processing is processing in which the input-output target data is compressed or decompressed;
wherein the user data is divided into a plurality of data elements which are written in a plurality of stripes of a stripe column, and the redundant code for the user data is parity created from the plurality of data elements included in the stripe column;
wherein the storage controller or the device controller is configured to manage creation trigger information showing whether an old redundant code of the stripe column corresponding to the user data was created after compression of data has been performed or before compression of data is performed; and
wherein the storage controller or the device controller is configured to control creation of a new redundant code as the redundant code corresponding to the user data based on the creation trigger information, the new redundant code being created after compression of the user data if the creation trigger information indicates the old redundant code was created after compression of data, the new redundant code being created before compression of the user data if the creation trigger information indicates the old redundant code was created before compression of data.

2. A storage control method for a storage system including:
a storage device including a recording device that stores data and a device controller that executes addition processing involving a change of state of the data with respect to the data; and a storage controller that controls input and output of data for the storage device, the storage control method comprising:

operating the storage controller to transmit, to the storage device, determination information that can be utilized for determining whether or not to execute predetermined addition processing along with input-output processing relating to input-output target data; and operating the device controller to control execution of the addition processing along with the input-output processing with respect to the input-output target data based on the determination information, wherein the device controller stores user data utilized by a host computer, and a redundant code that is used for recovering the user data and calculated based on the user data, wherein the determination information includes information with which whether input-output target data is the user data or the redundant code is identifiable, and wherein the device controller executes, in a case where input-output target data is identified as the user data based on the determination information, input-output processing that involves the addition processing with respect to the input-output target data, and executes, in a case where the input-output target data is identified as the redundant code, input-output processing that does not involve the addition processing;

wherein the addition processing is processing in which the input-output target data is compressed or decompressed;

wherein the user data is divided into a plurality of data elements which are written in a plurality of stripes of a stripe column, and the redundant code for the user data is parity created from the plurality of data elements included in the stripe column;

wherein the storage controller or the device controller manages creation trigger information showing whether an old redundant code of the stripe column corresponding to the user data was created after compression of data has been performed or before compression of data is performed; and wherein the storage controller or the device controller controls creation of a new redundant code as the redundant code corresponding to the user data based on the creation trigger information, the new redundant code being created after compression of the user data if the creation trigger information indicates the old redundant code was created after compression of data, the new redundant code being created before compression of the user data if the creation trigger information indicates the old redundant code was created before compression of data.

3. The storage system according to claim 1, wherein the redundant code of the user data is the parity created using one of all-stripe parity creation, conventional read modify write (RMW) parity creation, or off-load RMW parity creation.

4. The storage system according to claim 1, wherein the redundant code of the user data is the parity created through exclusive disjunction (XOR) of the plurality of data elements.

5. The storage system according to claim 1, wherein the redundant code of the user data is the parity created through exclusive disjunction (XOR) of the plurality of data elements which have been multiplied with a predetermined coefficient.

6. The storage control method according to claim 2, wherein the redundant code of the user data is the parity created using one of all-stripe parity creation, conventional read modify write (RMW) parity creation, or off-load RMW parity creation.

7. The storage control method according to claim 2, wherein the redundant code of the user data is the parity created through exclusive disjunction (XOR) of the plurality of data elements.

8. The storage control method according to claim 2, wherein the redundant code of the user data is the parity created through exclusive disjunction (XOR) of the plurality of data elements which have been multiplied with a predetermined coefficient.

* * * * *